(12) United States Patent
Flanagan et al.

(10) Patent No.: US 11,769,356 B2
(45) Date of Patent: Sep. 26, 2023

(54) COLLISION EVALUATION

(71) Applicant: Xtract360 Ltd, London (GB)

(72) Inventors: Michael Flanagan, London (GB); Joseph Hitchen, London (GB); Cillian Bourke, London (GB)

(73) Assignee: Xtract360 Ltd, London (GB)

( * ) Notice: Subject to any disclaimer, the term of this patent is extended or adjusted under 35 U.S.C. 154(b) by 148 days.

(21) Appl. No.: 16/764,001

(22) PCT Filed: Nov. 16, 2018

(86) PCT No.: PCT/GB2018/053322
§ 371 (c)(1),
(2) Date: May 14, 2020

(87) PCT Pub. No.: WO2019/097245
PCT Pub. Date: May 23, 2019

(65) Prior Publication Data
US 2020/0334928 A1    Oct. 22, 2020

(30) Foreign Application Priority Data

Nov. 17, 2017 (GB) ...................................... 1719108

(51) Int. Cl.
| | | |
|---|---|---|
| G06Q 40/00 | (2023.01) |
| G07C 5/08 | (2006.01) |
| G06N 20/00 | (2019.01) |
| G06N 3/008 | (2023.01) |
| G06N 5/04 | (2023.01) |
| G06Q 30/0283 | (2023.01) |

(Continued)

(52) U.S. Cl.
CPC .......... *G07C 5/0825* (2013.01); *G06N 3/008* (2013.01); *G06N 5/04* (2013.01); *G06N 20/00* (2019.01); *G06Q 30/0283* (2013.01); *G06Q 40/08* (2013.01); *G07C 5/008* (2013.01)

(58) Field of Classification Search
CPC ...... G07C 5/0825; G07C 5/008; G06N 3/008; G06N 5/04; G06N 20/00; G06Q 30/0283; G06Q 40/08
See application file for complete search history.

(56) References Cited

U.S. PATENT DOCUMENTS

| | | |
|---|---|---|
| 8,799,034 B1 | 8/2014 | Brandmaier et al. |
| 9,650,007 B1 | 5/2017 | Snyder et al. |
| 9,679,487 B1 | 6/2017 | Hayward |

(Continued)

FOREIGN PATENT DOCUMENTS

| | | |
|---|---|---|
| GB | 2528477 | 1/2016 |
| GB | 2554559 | 8/2020 |

(Continued)

OTHER PUBLICATIONS

Pawlus et al: "Mathematical modeling of a vehicle crash test based on elasto-plastic unloading scenarios of spring-mass models", The International Journal of Advanced Manufacturing Technology vol. 55, pp. 369-378. (Year: 2011).*

(Continued)

*Primary Examiner* — Edward J Baird

(57) ABSTRACT

A collision is analysed by receiving telematics data relating to a collision and determining a feature of the collision. An entity may be notified of said collision based on the determined features.

12 Claims, 24 Drawing Sheets

(51) Int. Cl.
  *G06Q 40/08* (2012.01)
  *G07C 5/00* (2006.01)

(56) References Cited

U.S. PATENT DOCUMENTS

| | | | |
|---|---|---|---|
| 9,786,154 B1 | 10/2017 | Potter et al. | |
| 9,792,656 B1 | 10/2017 | Konrardy et al. | |
| 9,886,841 B1* | 2/2018 | Nave | B60W 10/04 |
| 10,535,103 B1* | 1/2020 | Tofte | G06Q 40/08 |
| 2001/0028163 A1* | 10/2001 | Breed | G01F 23/2965 |
| | | | 180/274 |
| 2004/0036261 A1* | 2/2004 | Breed | B60C 23/0408 |
| | | | 280/735 |
| 2005/0161921 A1* | 7/2005 | Higuchi | B60R 21/207 |
| | | | 280/753 |
| 2008/0258443 A1* | 10/2008 | Lenning | B60R 21/01516 |
| | | | 280/735 |
| 2010/0030540 A1 | 2/2010 | Choi et al. | |
| 2010/0256863 A1* | 10/2010 | Nielsen | B60R 1/00 |
| | | | 701/31.4 |
| 2011/0153367 A1 | 6/2011 | Amigo et al. | |
| 2012/0094628 A1 | 4/2012 | Mader et al. | |
| 2013/0295900 A1* | 11/2013 | Hood | H04W 4/40 |
| | | | 455/418 |
| 2014/0365907 A1 | 12/2014 | De Freitas et al. | |
| 2015/0145662 A1 | 5/2015 | Barfield, Jr. et al. | |
| 2015/0149218 A1 | 5/2015 | Bayley et al. | |
| 2015/0262487 A1* | 9/2015 | Cazanas | G08G 1/16 |
| | | | 701/301 |
| 2019/0164229 A1* | 5/2019 | Sbianchi | G06Q 30/0282 |
| 2021/0295441 A1* | 9/2021 | Mullen | G08G 1/0133 |

FOREIGN PATENT DOCUMENTS

| | | | | |
|---|---|---|---|---|
| JP | 2016-030481 | | 3/2016 | |
| JP | 2016-184336 | | 10/2016 | |
| KR | 2011-0109310 | | 10/2011 | |
| WO | WO-2015036307 A1 * | 3/2015 | | G06Q 10/10 |
| WO | WO 2017/158155 | | 9/2017 | |
| WO | WO-2018046743 A1 * | 3/2018 | | G06Q 10/0635 |
| WO | WO 2019/097245 | | 5/2019 | |

OTHER PUBLICATIONS

International Search Report and the Written Opinion dated Feb. 5, 2019 From the International Searching Authority Re. Application No. PCT/GB2018/053322. (14 Pages).

Patents Act 1977: Search Report under Section 17(5) dated Sep. 10, 2018 From the Intellectual Property Office of the United Kingdom of Great Britain Re. Application No. GB1719108.1 (7 Pages).

Notice of Reasons for Rejection dated Oct. 25, 2022 From the Japan Patent Office Re. Application No. 2020-544991. (7 Pages).

* cited by examiner

| Plate #1 | 06/01/2017 | 21:28 |
| Location #1 | OVERHEAD STREETVIEW ONBOARD » CLAIM » | |

DAMAGE  Corner impact
MINI COOPER 1598cm
Estimated repair
£ 4,155

WHIPLASH CLAIM ESTIMATOR  £ 2,750
⊖ 1 ⊕  Number of passengers   Approx whiplash claims amount

THIRD PARTY VEHICLE  Registration number
This information will help us to provide details of third party vehicle involved
SAVE

— 4700

ESTIMATED REPAIR
Uncheck items to remove from estimate

Parts

| Bumper Front Reinforcement Panel | £134 |
| Wing Front RH | £105 |
| Subframe Front Extension RH | £38 |
| Bonnet Landing Panel | £109 |
| Chassis Leg Front and Inner Wing RH | £298 |
| Front Panel | £226 |
| Bumper Front | £182 |
| Wing Front Inner Side R/forcement RH | £54 |
| Bonnet | £284 |
| Paint Cost | £445 |

Labour
38hrs @ £60  £2,280

Total repair costs  £4,155   SAVE

Map | Satellite

▷ 21:29:21

IMPACT 21:29:26
5.1
G-force

COLLISION EVALUATION

RELATED APPLICATIONS

This application is a National Phase of PCT Patent Application No. PCT/GB2018/053322 having International filing date of Nov. 16, 2018, which claims the benefit of priority of United Kingdom Patent Application No. 1719108.1 filed on Nov. 17, 2017. The contents of the above applications are all incorporated by reference as if fully set forth herein in their entirety.

FIELD AND BACKGROUND OF THE INVENTION

This invention relates to using data related to a collision to evaluate a feature of that collision.

Following a vehicle collision, vehicles may require repair, or insurers may need to pay compensation for injuries. In order to perform a suitable action, an entity, such as an insurance company, needs to evaluate aspects of the collision to determine how the liability should be split between the parties involved and the value of the claim.

Currently, an evaluation of liability is largely dependent upon witness testimony, which is vulnerable to fraud, or a driver not remembering a piece of information. To mitigate this problem, recorded data is sometimes used, where data may be recorded by:
  Event Data Recorders (EDRs) installed by original equipment manufacturers (often connected to airbag control circuits);
  'Black box' telematics devices, which can be used to monitor the operation of a vehicle. Such devices may be fitted by insurance providers to price insurance premiums depending on how 'safe' the driver is being;
  Dashcams' (dashboard mounted cameras) which can provide a visual recording of a collision.

However, the data provided by such recording devices requires analysis by a trained operative, which has an associated cost with it. This problem is exacerbated by the information regarding the crash being displayed in a format which is difficult to interact with and interpret: this can make the determination of liability a difficult and lengthy process.

After determining what has happened in a crash, and the liability (or split of liability) it is also necessary to obtain an estimate of financial redress required for either party. This typically involves a loss adjuster inspecting damage, which is also a long and costly process. In particular, in some instances it is more cost-effective to simply replace, rather than repair a vehicle (a 'write-off'), but this is only determined after spending significant amounts of time and money on an inspection.

SUMMARY OF THE INVENTION

It is therefore desirable to attain a solution to one or more of the problems identified.

According to one aspect of the present invention there is provided a method of analysing collision data, the method comprising: receiving telematics data relating to a collision; determining a collision severity based on said data; and notifying an entity of said collision based on the determined severity of the collision. In such a way, a relevant entity is notified of a collision without requiring user intervention. By virtue of the method an objective, factual account of the collision and the circumstances and consequences of the collision can be provided. This can overcome problems of unreliable witness and incorrect, subjective account of the collision.

Optionally, the method comprises determining an impact area based on said received telematics data. In such a way, the severity of the collision and subsequent relevant actions can be more accurately determined. Preferably, the impact area comprises one or more zones relating to a vehicle; or one or more points on a vehicle.

For accuracy determining an impact area may comprise determining a rotation of a vehicle and/or a partial or full inversion of a vehicle.

The method may further comprise determining one or more events associated with the collision. The associated events may be one or more of: harsh braking; harsh cornering; harsh acceleration; harsh deceleration; rotation of a vehicle; partial or full inversion of a vehicle; loss of traction; and a secondary collision. By determining events associated with the collision an account of the course of events associated with the collision can be provided.

The method may comprise modelling or simulating a collision, preferably at subsecond resolution. By modelling or simulating a collision an account of the course of events associated with the collision can be provided.

Repair Features

For efficiency, the method may further comprise determining a cost of repair.

Optionally, the cost of repair is determined based on a cost of components in an impact area. Optionally, the method further comprises determining the likelihood of a component being damaged based on the received telematics data.

For prediction accuracy, determining the likelihood of a component being damaged may comprise a comparison to historical impact data. Preferably, a trained classifier is used to determine the likelihood of a component being damaged, said trained classifier having been trained by said historical impact data.

For efficiency, if said estimated repair cost is less than a threshold amount, said entity may comprise a repair entity; if said estimated repair cost is greater than a threshold amount, said entity may comprise a salvage entity. Preferably, said threshold amount is a replacement value.

Notifying Features

For safety and speed, said entity may comprise an emergency service if said collision severity is above a threshold level.

Optionally, said entity may comprise an occupant of a vehicle involved in said collision.

So as to enable a quick evaluation of the collision, said entity may be an insuring entity.

For safety, said notification may comprise an assessment of the road-worthiness of one or more vehicles involved in the collision.

Determining Features

For safety, the method may further comprise determining a probability of injury. Optionally, determining the probability of injury comprises determining the magnitude and direction of the collision. Optionally, determining the probability of injury comprises determining the rotation of the vehicle. Optionally, determining the probability of injury comprises detecting partial or full inversions of the vehicle. Optionally said probability of injury relates to a probability of whiplash. Optionally, the method further comprises determining an injury compensation cost.

For accuracy, determining a probability of injury may comprise a comparison to historical impact data. Optionally a trained classifier is used to determine the probability of injury, said trained classifier having been trained by said historical impact data Receiving Features For accuracy, the telematics data may comprise data from a gyroscope, an accelerometer, GPS data, a video recording, onboard diagnostics data and/or an audio recording.

For a smooth vehicle trajectory the method may comprise interpolating GPS and accelerometer data points for determining a vehicle trajectory.

For speed and/or efficiency the telematics data may be received via a wireless link to a device which collected the data.

For reliability, said wireless link may comprise a satellite link.

The telematics data may comprise data from a 6-10 second period containing a collision. The telematics data (or a part thereof) may be at, for example, 20 Hz, 50 Hz, 100 Hz, 400 Hz, 500 Hz, 1000 Hz or 5000 Hz, or in a range formed by any two of these exemplary values. Preferably the telematics data (or a part thereof) has at least subsecond resolution, preferably a resolution of at least 100 milliseconds, more preferably at least 50 milliseconds, more preferably at least 10 milliseconds. Resolution may in some examples be submillisecond. A first part of the telematics data, and preferably the accelerometer data and/or gyroscope data, may be at subsecond resolution. A second part of the telematics data, and preferably the GPS data, may be at lower resolution than the first part.

Modelling or simulating a collision may be at least at subsecond resolution (preferably with a resolution of at least 100 milliseconds, more preferably at least 50 milliseconds, more preferably at least 10 milliseconds). Subsecond resolution can enable resolution of distinct events prior to and subsequent to a collision (e.g. harsh breaking, follow-on collision). The modelling or simulating may be at, for example, a resolution of 0.2 ms, 1 ms, 2 ms, 2.5 ms, 5 ms, 10 ms, 20 ms, 50 ms, or 100 ms, or in a range formed by any two of these exemplary values. This can help clarify the sequence of events, potentially beyond the limits of human perception, and so provide insight into the collision. Subsecond resolution can also permit identification of forces acting on the vehicle with sufficient resolution to identify areas of impact. Resolution may in some examples be submillisecond. Modelling or simulating a collision preferably comprises determining one or more events associated with the collision.

Analysis Features

For efficiency, the method may further comprise determining a measure of liability. The measure of liability may be determined in dependence on a right of way, a classification of a road or a junction, a lane a vehicle is in, a lane change manoeuvre, a measure of a manoeuvring intent, and/or a reversing movement. The measure of liability may be determined in dependence on a highway code, case law, and/or mapping information. The method may further comprise obtaining data (preferably from external sources) relating to a highway code, case law, and/or mapping information. Preferably the method comprises determining the measure of liability by a cognitive reasoning model. By taking both telematics data and other data into account in determining a measure of liability, an objective assessment of liability can be provided. Using a cognitive reasoning model can permit complex evaluation of numerous factors that can be taken into account in determining liability.

Optionally, said telematics data is used to evaluate the operation of a further entity involved in said collision. Optionally, said telematics data is used to determine a momentum of said further entity.

For accuracy, the method may further comprise obtaining data (preferably from external sources) related to one or more other vehicles involved in said collision. Optionally, said further entity data is obtained using a vehicle registration number.

For accuracy and/or so as to determine additional information the method may further comprise determining a mass of said further entity based on said further entity data.

So as to determine liability, the method may further comprise determining the velocity of said further entity based on its momentum and mass. Optionally, the method further comprises determining whether said further entity was speeding preceding said collision.

For accuracy, determining said collision severity may comprise determining a time of collision.

For accuracy, determining a time of collision may comprise determining the time of highest magnitude of acceleration based on said received telematics data. Optionally, determining said highest magnitude of acceleration comprises determining a root mean squared magnitudes of acceleration in two or three dimensions.

For accuracy, determining a time of collision may comprise determining an acceleration exceeding a maximum braking and/or cornering force.

Optionally, determining a time of collision comprises determining a time of the maximum vertical acceleration. Vertical accelerations are very rare under normal circumstances, so the detection of a maximum vertical acceleration may be highly indicative of a collision.

Optionally, determining said collision severity comprises determining a force caused by said collision.

For accuracy, determining a force caused by said collision may comprise modelling or determining a model for the elasticity of an object involved in said collision.

For accuracy, said model for the elasticity of an object involved in said collision may comprise determining at least one spring constant based on said received telematics data.

For accuracy, determining a spring constant based on said received telematics data may comprise determining a frequency of data from said received telematics data. Preferably the telematics data comprises accelerometer data and the force is determined in dependence on the accelerometer data.

For accuracy, determining a force caused by said collision may comprise modelling or determining a momentum change of an object involved in said collision. Optionally, said momentum change is determined by integrating the acceleration over a time window around a determined impact time.

Determining a collision severity and/or determining events associated with the collision may comprise modelling or simulating a collision to evaluate a collision severity and/or events associated with the collision. Determining other features may comprise modelling or simulating a collision to evaluate said features. Such features may include an impact area, a cost of repair, a likelihood of a component being damaged, a probability of injury, a magnitude or direction of a collision, a rotation of a vehicle, an injury compensation cost, a measure of liability, a momentum of a further entity, a velocity of a further entity, a time of collision, a time of highest magnitude of acceleration, a force caused by a collision, an elasticity of an object involved in a collision, a spring constant, a momentum change of an object involved in a collision, an event preceding a collision, an acceleration above a threshold level, a change in direction and/or speed, and/or a loss of traction.

Interface Features

For ease of use, the method may further comprise: determining at least one event preceding (or following or associated with) said collision based on said received telematics data; and sequentially displaying said at least one event and said collision via a user interface.

According to another aspect of the present invention there is provided a method for displaying collision data, the method comprising: receiving telematics data relating to a collision; determining at least one event preceding (or following or associated with) said collision based on said received telematics data; and sequentially displaying said at least one event and said collision via a user interface. In such a way a user can easily and quickly determine key events leading up to a collision which may determine further actions (e.g. further investigation or approving a claim).

For accuracy, determining at least one event preceding said collision based on said received telematics data may comprise determining an acceleration above a threshold level.

For accuracy, determining at least one event preceding said collision based on said received telematics data may comprise determining a change in direction and/or speed. Optionally, said change in direction comprises movement onto a different road.

For ease of use, the method may further comprise means for a user to alter the time period shown on the interface.

For ease of use, the method may further comprise indicating a property of said telematics data relating to said event. Optionally said displayed property comprises a speed indicator, a g-force measurement, an indication of braking, an indication of cornering, an indication of a loss of traction event, an indication of a rotation of a vehicle, an indication of a partial or full inversion of a vehicle, an indication of an impact area, and/or safe speed (which may be dependent upon a legal speed limit and/or the weather and/or a feature of the road).

For ease of use, the method may further comprise displaying a map of the area of said collision. Optionally, the method further comprises displaying a representation of said vehicle. Optionally, the method further comprises displaying the path of said vehicle.

For ease of use, the method may further comprise displaying the locations of one or more events. Optionally, the method further comprises displaying a contextual indicator related to the time of the collision. Optionally said contextual indicator comprises an indication of the weather conditions, and/or a traffic density.

For ease of use, the method may further comprise providing a user with means for annotating said one or more events.

Optionally, the method further comprises providing an indication of damage to a vehicle. Optionally, said indication comprises indicating an area of a vehicle which has been damaged. Optionally said indication comprises a 3D visualisation of said vehicle. In such a way a user is provided with a manner in which to determine remotely the likely damage to a vehicle.

According to another aspect of the present invention there is provided an apparatus for analysing collision data, the apparatus comprising: means (for example in the form of a suitably programmed processor and associated memory) for receiving telematics data relating to a collision; means for (for example in the form of a suitably programmed processor and associated memory) determining a collision severity based on said data; and means for (for example in the form of a suitably programmed processor and associated memory) notifying an entity of said collision based on the determined severity of the collision.

According to another aspect of the present invention there is provided an apparatus for displaying collision data, the apparatus comprising: means for (for example in the form of a suitably programmed processor and associated memory) receiving telematics data relating to a collision; means for (for example in the form of a suitably programmed processor and associated memory) determining at least one event preceding said collision based on said received telematics data; and means for (for example in the form of a suitably programmed processor and associated memory) sequentially displaying said at least one event and said collision via a user interface.

The invention also relates to an apparatus adapted to carry out any method described herein.

According to another aspect of the present invention there is provided a system for analysing collision data, the system comprising: an apparatus as described herein and means for (for example in the form of a suitably programmed processor and associated memory) transmitting telematics data to said apparatus.

Optionally, the system further comprises means for (for example in the form of a suitably programmed processor and associated memory) recording said telematics data.

Optionally, said means for transmitting and/or recording said telematics data comprises a mobile phone.

According to another aspect of the present invention there is provided a method of modelling a collision from telematics data. The telematics data may be raw numerical data from a generic file.

The method may comprise organising the telematics data. The method may comprise computing a collision model from the telematics data. The method may comprise determining events associated with the collision (leading to and/or subsequent to the collision). The method may comprise illustrating events leading to (and/or subsequent to) the collision, preferably with a digital mapping software. The method may comprise illustrating vehicle micro-movement (with subsecond resolution) in a digital mapping software. The method may comprise illustrating vehicle movement and/or events associated with the collision at subsecond resolution (e.g. with a resolution in the range of 1-1000 milliseconds, more preferably 10-100 milliseconds). By virtue of the method an objective, factual account of the collision and the circumstances and consequences of the collision can be provided. This can overcome problems of unreliable witness and incorrect, subjective account of the collision.

According to another aspect of the present invention there is provided a method of analysing collision data, the method comprising: receiving telematics data relating to a collision; determining one or more events associated with the collision; and providing a course of events associated with the collision. The method may include features as aforementioned. By virtue of the method an objective, factual account of the collision and the circumstances and consequences of the collision can be provided. This can overcome problems of unreliable witness and incorrect, subjective account of the collision.

According to another aspect of the present invention there is provided a method of analysing collision data, the method comprising: receiving telematics data relating to a collision; determining a measure of liability based on said data; and notifying an entity of said collision based on the determined severity of the collision. The method may include features as aforementioned. By virtue of the method an objective, factual account of the collision and the circumstances and consequences of the collision can be provided. This can overcome problems of unreliable witness and incorrect, subjective account of the collision. By taking telematics data (and optionally other data) into account in determining a measure of liability, an objective assessment of liability can be provided. Complex evaluation of numerous factors can be taken into account in determining liability. By virtue of the method an objective, factual account of the collision and the circumstances and consequences of the collision can be provided. This can overcome problems of unreliable witness and incorrect, subjective account of the collision.

As used herein 'telematics data' may refer to any data relating to the movement or operation of an entity, such as a vehicle.

As used herein 'operator' may refer to any entity controlling a vehicle, where this operator may be a person, an apparatus, or a combination thereof.

As used herein 'collision' may refer to any event where a threshold measurement is exceeded, a collision does not necessarily comprise an impact.

The invention extends to any novel aspects or features described and/or illustrated herein.

Further features of the invention are characterised by the other independent and dependent claims.

Any feature in one aspect of the invention may be applied to other aspects of the invention, in any appropriate combination. In particular, method aspects may be applied to apparatus aspects, and vice versa.

Furthermore, features implemented in hardware may be implemented in software, and vice versa. Any reference to software and hardware features herein should be construed accordingly.

Any apparatus feature as described herein may also be provided as a method feature, and vice versa. As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently.

The invention also provides a computer program and a computer program product comprising software code adapted, when executed on a data processing apparatus, to perform any of the methods described herein, including any or all of their component steps.

The invention also provides a computer program and a computer program product comprising software code which, when executed on a data processing apparatus, comprises any of the apparatus features described herein.

The invention also provides a computer program and a computer program product having an operating system which supports a computer program for carrying out any of the methods described herein and/or for embodying any of the apparatus features described herein.

The invention also provides a computer readable medium having stored thereon the computer program as aforesaid.

The invention also provides a signal carrying the computer program as aforesaid, and a method of transmitting such a signal.

The invention extends to methods and/or apparatus substantially as herein described with reference to the accompanying drawings.

BRIEF DESCRIPTION OF THE SEVERAL VIEWS OF THE DRAWINGS

The invention will now be described by way of example, with references to the accompanying drawings in which:

FIGS. 18a, 18b, 18c and 18d show views of an interface which contains a section for viewing information related to a potential claim.

DESCRIPTION OF SPECIFIC EMBODIMENTS OF THE INVENTION

The invention relates to methods of evaluating a collision and determining appropriate actions based upon an output of this evaluation. The severity of a collision may be used to determine an entity to notify such as emergency services or a tow truck.

The severity of a collision may depend on a number of factors including the area of the impact. From this information it is possible to determine a cost of repair and a list of required parts.

The invention also relates to a user interface which sequentially presents key events leading up to a collision so that an accurate picture of the collision can be quickly obtained by the user.

The invention also relates to a model that inputs raw numerical data from a generic file, organises it and computes onto a digital mapping software to illustrate vehicle micromovement (i.e. at subsecond resolution).

The claim analysis platform described herein consumes telematics data provided from entities involved in a collision via a dynamic interface (e.g. Representational State (REST) Application Program Interface (API)) and/or import functions. This data is analysed and insights are extrapolated.

An artificial intelligence engine may be used to continuously adjust models to understand better the nuances surrounding individual incident observations and as a result, it can continuously improve the accuracy of insights derived from newly encountered telematics data sets, e.g. cause and effect leading to a multi-vehicle collision.

Figure 1:
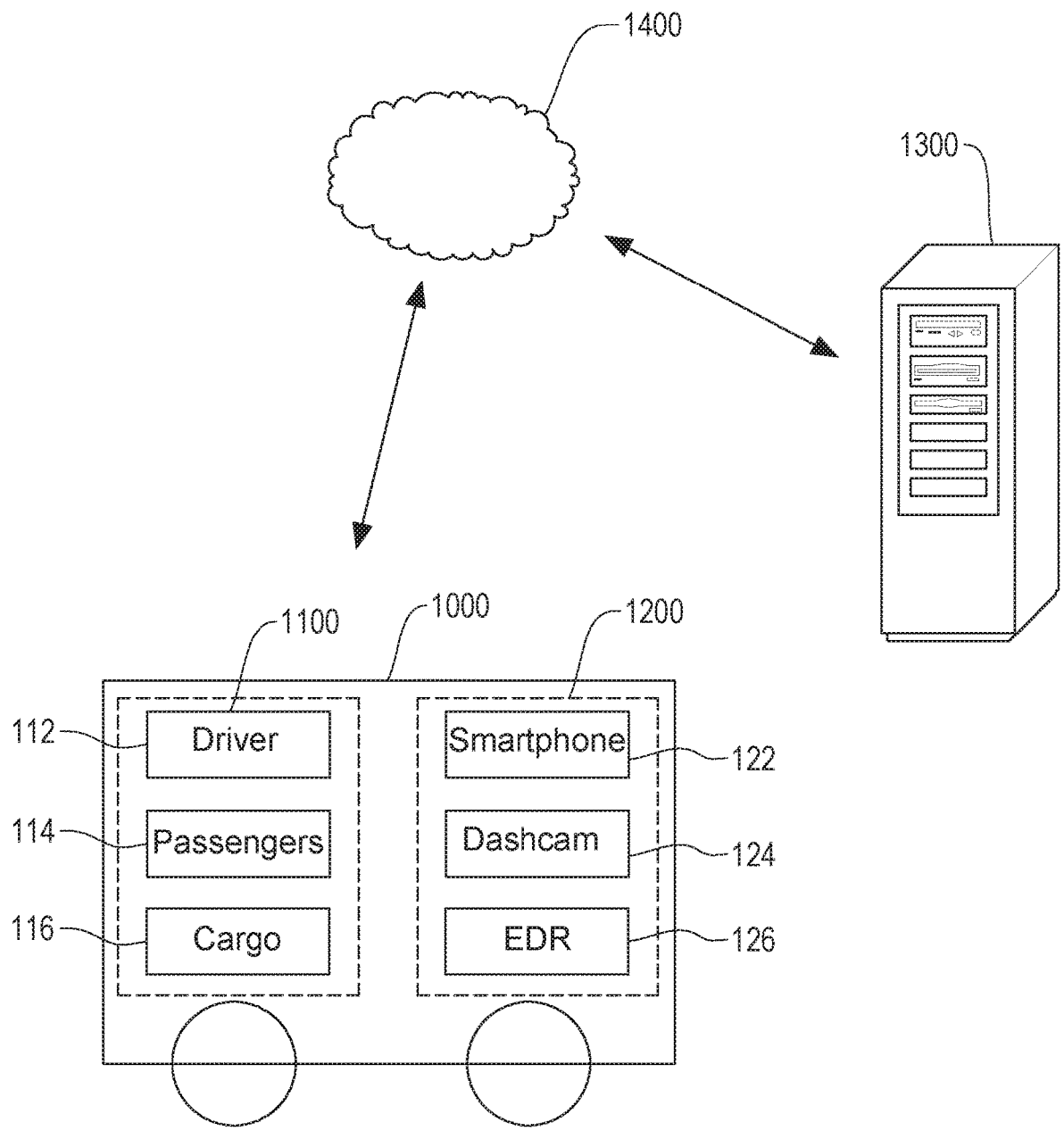
FIG. 1 shows a system for recording evaluating a collision.

FIG. 1 shows a system for evaluating a collision.

A vehicle 1000 contains occupants 1100, such as: an operator (driver) 112, one or more passengers 114, and/or cargo 116.

The vehicle may be semi-autonomous ('self-driving'), in which case the operator (driver) 112 would be considered to be a processor or operating system controlling the vehicle.

Throughout operation of a vehicle, telematics data is recorded using one or more data recording devices 1200, for example: a smartphone 112, a dashcam 114, or an event data recorder (EDR) 116, commonly known as a 'black box'.

The vehicle 1000 communicates to a sever 1300 via a network 1400 such as the internet.

Figure 2:
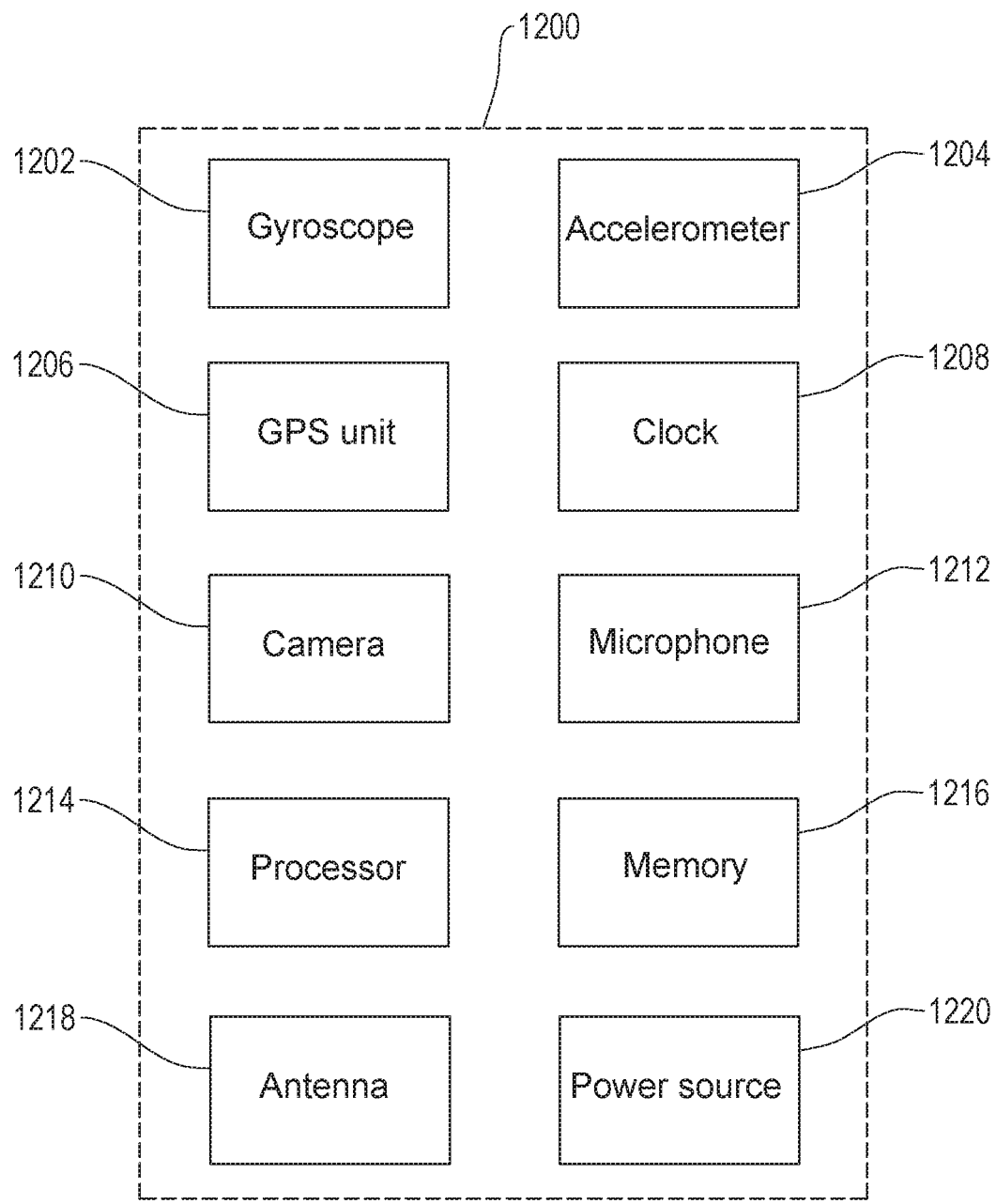
FIG. 2 illustrates a data recording device.

FIG. 2 illustrates a data recording device.

This data recording device 1200 comprises:
one or more gyroscopes 1202;
one or more accelerometers 1204;
a GPS unit 1206; and
a time recording means (e.g. a clock 1208).
a processor 1214, which co-ordinates data recording;
memory 1216 where data is stored;
an antenna 1218, to transmit recorded data (for example to a server where evaluation occurs) or receive updated software; and
a power source 1220, for example an internal battery, or a connector (such as a USB connection which transfers power from the vehicle battery).

Advantageously, a combination of these components are commonly found in smartphones, or in the black boxes installed by car manufacturers or insurance companies. The device may be a retro-fit device secured to the vehicle.

The recording means preferably also comprises:
a video recording means, such as a dashcam, 1210; and
an audio recording means, i.e. a microphone 1212.

Due to the unpredictable nature of collisions, it is necessary to record data during the entirety of a journey to ensure that data corresponding to a collision is captured. However due to the privacy concerns of users it is desirable to record, and/or to store, only necessary data. As such, only recorded data related to a time period preceding and following a collision is retained: for example data from the beginning of the journey during which a collision occurs, or from an amount of time preceding and following the collision. In an example a data file from a 6-10 second excerpt of a collision is stored and analysed. Data not related to a collision is overwritten or deleted. This recording/deletion may occur in a circular fashion so that only the last 'X' minutes of data is ever available.

The data stored comprises at least one of the following: acceleration ('g-force'), GPS location, velocity, time, and location data as well as the location of any impact, and the time interval over which an impact occurs. If available, video data and/or audio data is also stored. If the vehicle has sufficient sensors, information such as brake activation, steering adjustment, airbag deployment, engine conditions etc. may be recorded.

If the data recorder includes (or is connectable to) a user's mobile phone, data may be recorded relating to a user's interactions with their phone (for example, whether or not they were on a call). The data recorder may connect to a user's mobile phone using Bluetooth™ or another form of wired or wireless connection.

Further data, such as weather conditions, or road conditions, is also stored. Such data may be obtained from a source unconnected to the vehicle involved in the condition, such as a weather reporting service. This further data is collected using the data recording means 1200, where the processor 1214 connects to an area network using the antenna 1218 and downloads data.

This further data may be obtained at a later time using historical weather information relating to the location of a collision. This embodiment is advantageous for situations where a data recording means is not able to connect to a network at the time of the collision.

The stored data is used to evaluate a collision, where this evaluation is used to determine further action such as to notify an entity or to evaluate a claim.

In some embodiments, the data recording device is also usable as an on-board diagnostics (OBD) system, where the device is used to inform occupants of the vehicle about any potential issues, such as mechanical faults. The device may also suggest steps that should be taken to address any issues.

Figure 3:
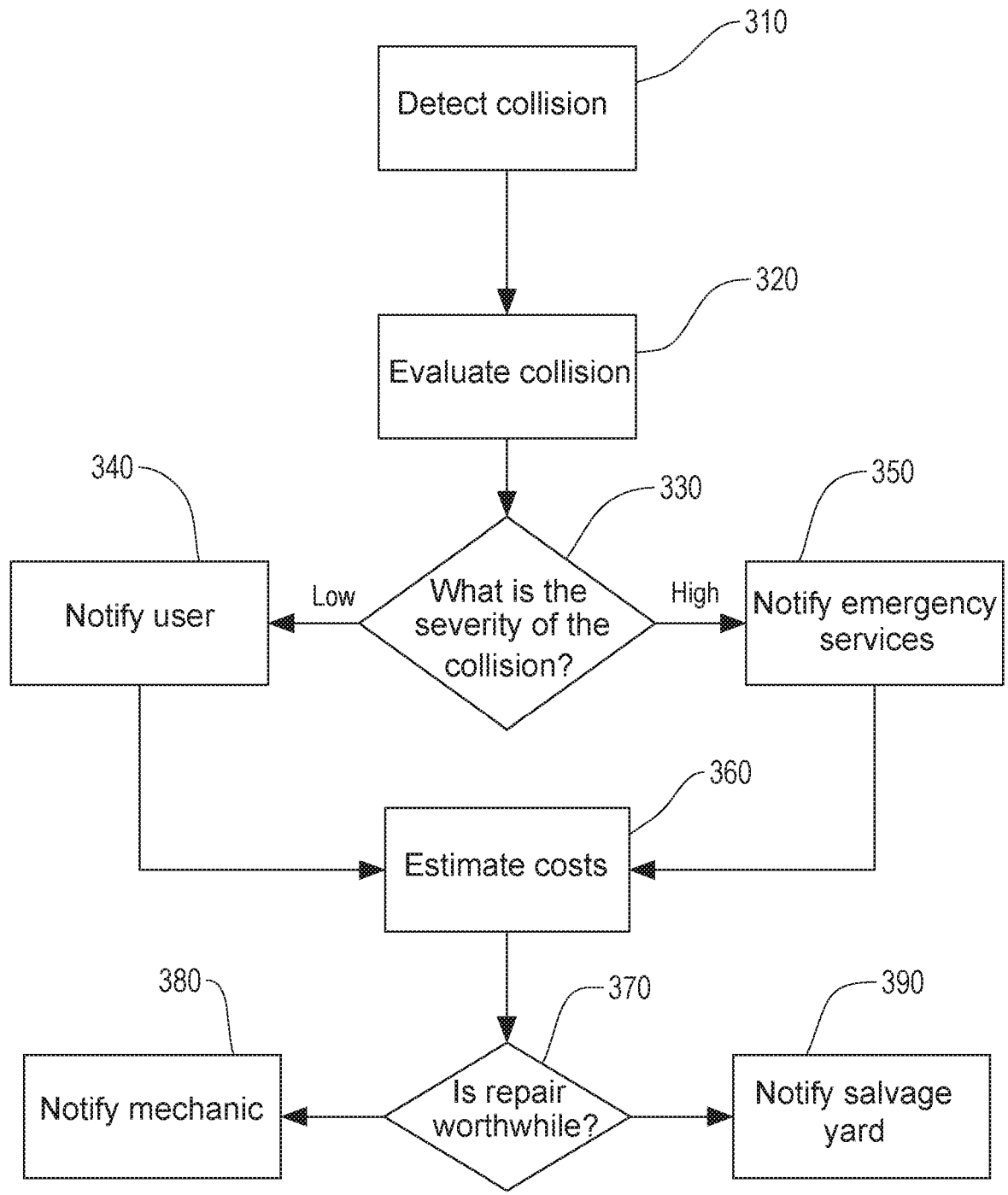
FIG. 3 shows a flowchart for reacting to a collision where a collision evaluation is required.

FIG. 3 shows a flowchart for reacting to a collision where a collision evaluation is required:

1. In a first step 310, a collision is detected using a data recording means, where an acceleration (g-force) above a threshold value (in a certain direction) indicates a collision. Other measurements such as calculated energy absorbed by the vehicle, or an indication that an airbag has been deployed may also be used to detect a collision. It may be advantageous to combine multiple methods to avoid false positives (for example, rapid acceleration forwards would be indicative of a 'shunt' collision, but a similar acceleration backwards may simply be sharp braking).

Immediately following the collision a first notice of loss (FNOL) is transmitted to the insurer of the vehicle, where this FNOL comprises recorded information related to the collision. By rapidly obtaining a detailed FNOL, an insurance company is able to quickly assess the impact of a collision, e.g. does money need to be set aside, does a temporary car need to be obtained.

Recorded data relevant to the collision is stored, to be used in an evaluation and accessed later if deemed necessary by any party, this data may comprise evidence for a decision—e.g. to reject a claim.

2. In a second step 320, this collision is evaluated, where this evaluation is discussed in further detail in later sections of the description. The collision severity is an output of the evaluation.

The telematics data relating to the collision is transmitted to a server where it is stored and a collision evaluation is performed. Alternatively, this processing may be performed on a local device, such as a smartphone 112.

3. In a third step 330, the severity of the collision is queried, where the fourth step depends on the severity of the collision:

4A. If the collision is of a low severity, in a fourth step 2400 the occupants of the vehicle are notified; this notification is used to query the occupants as to the nature of the collision. It is possible that a false positive collision is detected, where heavy braking results in a g-force threshold being exceeded; an occupant is then be able to confirm whether or not a collision has taken place, and whether or not assistance is required.

A low severity collision notification is also used to notify the occupants of the vehicle about the status of the vehicle: such a notification might suggest that the vehicle is, or is not, safe to continue driving as well as informing the occupants of components which are predicted to have been damaged; these components can then be inspected, either by an occupant of the vehicle or by a mechanic. This process is described in more detail below.

4B. If the collision is of a high severity, in a fourth step 350 the emergency services are contacted, for example an ambulance service is notified. This notification incorporates information related to the collision, such as the number of vehicles involved, the location, the severity, and any predicted injuries. The services contacted depend upon features of the collision: a high severity collision which takes place on a motorway may result in the police being contacted, as the motorway may need to be closed; a collision which involves an impact in the area of a fuel tank may result in a fire department being contacted, to control any resultant fires.

In some embodiments, upon a high severity collision being detected, a notification is transmitted to an occupant with suggested actions: if injuries are expected it is suggested that an ambulance is called. The occupant can then confirm that such actions are, or are not, appropriate. If the occupant does not respond within a set time period, the suggested action is taken, for example an ambulance service is notified.

5. In a fifth step 360, the evaluation is used to estimate costs related to the collision, such as repair costs for the vehicles involved and potential injury claim costs.

This cost estimation 360 takes into account the severity of the collision and the location of any impacts in order to predict damage to components or occupants. This assessment is based solely on data obtained from the data recording means, thereby avoiding the costs and delays associated with examinations by a mechanic, or a doctor. This process is described in more detail below.

These costs are used to inform decisions about actions to be taken: in cases where high costs are predicted, further examination by a mechanic and/or doctor is considered, if lower costs are predicted it may be more cost effective to pay each party involved without any further investigation.

In some embodiments, a parts order is automatically generated, where parts are sourced alongside costs and an order form for these parts is automatically completed. An agent may review such an order before it is transmitted.

6. In a sixth step 370, the repair cost is used to assess whether it is worthwhile to repair at least one of the vehicles involved, i.e. is the cost of repair (including factors such as the cost of labour) less than the cost of replacement; this is described further in FIG. 7.

7A. If repair is deemed to be worthwhile (i.e. if the replacement cost exceeds the predicted repair cost), in a seventh step 380, a mechanic is notified. A tow company is also notified, so that the car may be rapidly taken to the mechanic.

7B. If repair is deemed to be not worthwhile, in a seventh step 390, a salvage yard is notified and the car is collected and scrapped.

The data stored is used as an input for a user interface (described in more detail later) where a user, such as an insurance agent, is able to view details about the collision in order to understand the features of the collision. In such a way, a user can confirm or intervene the automated actions determined from the telematics data, or input additional information.

In some examples, the steps described here are incorporated into such an interface, where upon a collision being detected and evaluated an agent receives a notification and is able to follow the method described: the agent is able to view the outputs of the collision evaluation and send a notification to occupants/emergency services/repairers as necessary.

In some examples, further notifications are sent to:
inform the family of an occupant of the vehicle of a crash.
enable a party to assess an operator's performance.
send the location of any occupants to a party.
create an automated claim: where data is transmitted to an insurer which provides an apparatus (for example a web based form) such that the information required for a claim is input automatically.

The costs estimated 360, comprise at least one of: expected costs, an expected cost range, and an expected maximum cost. A different cost may be used in different situations: a high maximum cost may induce further investigation; a minimum expected cost may be used in an offer to an insured party, (i.e. where a case may be settled rapidly if the party accepts this offer); an expected cost range results in any claim that falls within this range being paid with little further investigation, where any higher claim is investigated.

The costs estimated 360 are then saved and/or transmitted to an occupant of the car, and/or a third party, such as an insurance agent.

Some features of the system and method are:
Inflexible data from any source can be accepted and formatted for use as described.
GPS and accelerometer data points can be interpolated to smoothen the movement.
Bi-directional movement of the accelerometer can be analysed to identify the impact zone.
Collision severity can be refined by considering data from a vehicle registration by correlating vehicle make and model with the zone of impact and g-force to retrieve the vehicle damage zones and respective severity.
Estimating vehicle damage value from the damaged zones and severity, and comparing it with the vehicle value for a triage decision.
Using the mass of two vehicles and the speed/g-force of one vehicle to calculate the unknown speed of the second vehicle.

Collision Evaluation

Figure 4:
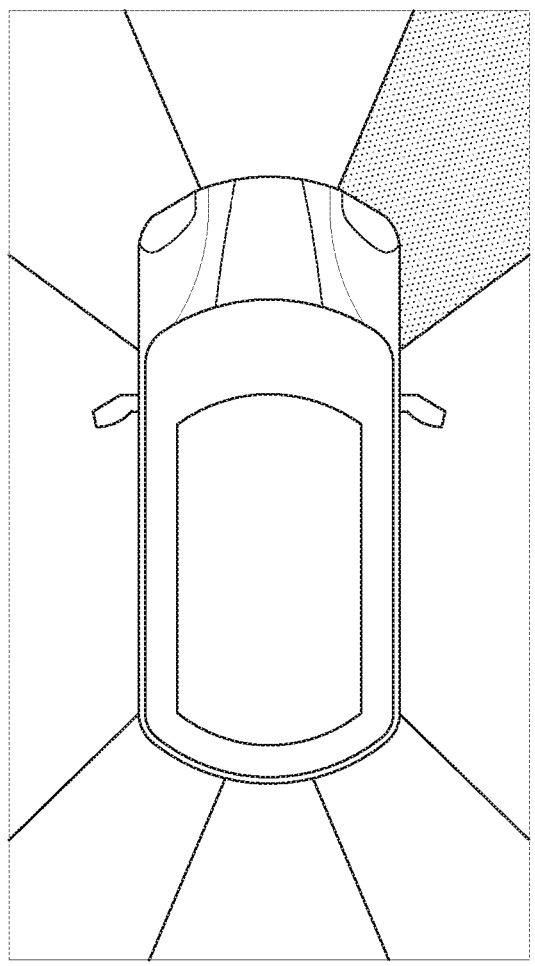
FIG. 4 shows a collision damage assessment.

FIG. 4 shows a collision damage assessment.

The data stored after a collision is used to estimate the location and severity of each impact and the resultant damage caused to the vehicles and occupants involved.

An impact area (or 'zone') can be determined from the direction of the acceleration recorded by the accelerometers. FIG. 4 shows a vehicle split into 8 different areas, but more or fewer areas may be appropriate depending on the accuracy of the accelerometer measurement. This process is described in more detail below with reference to FIGS. 5-10. It is possible that several areas may be affected, for example, if a particularly high acceleration is measured areas neighbouring the impact area may also be affected. Similarly, several accelerations may be detected—for example if a vehicle 'shunts' a vehicle in front and is in turn 'shunted' by a following vehicle.

By identifying and analysing a spike in g-force and the micro-movement of a vehicle in a given direction, the impact direction and hence impact zone can be determined. Once the impact zone is determined further analysis can quantify damage to the area, which then correlates with vehicle value to deliver a total loss decision. In case a third party vehicle is involved a mass for each vehicle is assumed (e.g. by looking up vehicle make and model and weight for given vehicle registration numbers) and by using the speed and g-force of the known vehicle the speed of the third party vehicle can be estimated.

Figure 5:
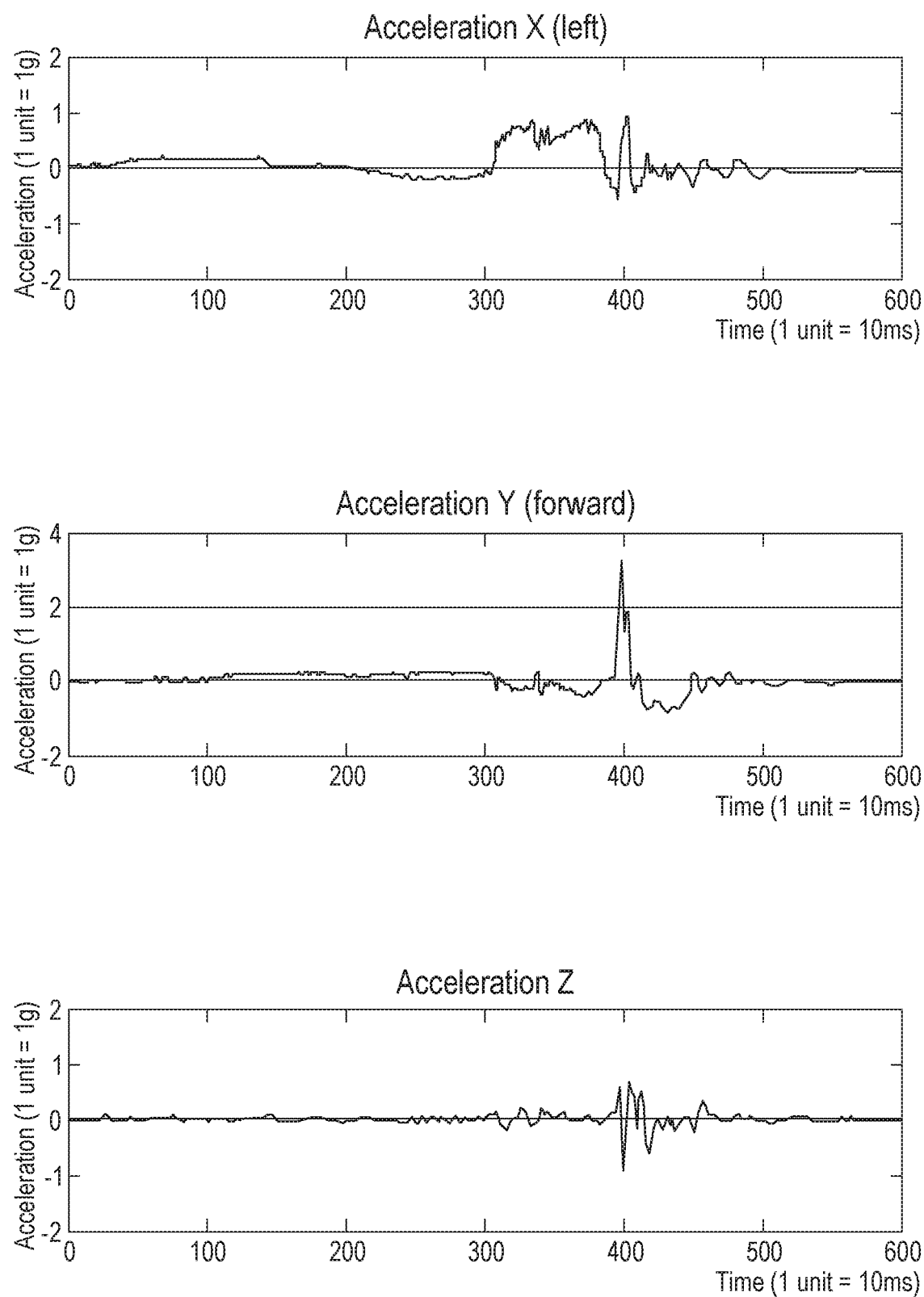
FIG. 5 shows a graphical example of accelerometer data.

FIG. 5 shows a graphical example of accelerometer data.

The acceleration is split into components: lateral (side to side), longitudinal (front to rear), and vertical; the time of impact is then determined from one or more of:

the time of highest magnitude of acceleration (e.g. the time of a maximum of the root mean squared magnitudes of acceleration in two or three dimensions);

an acceleration exceeding a maximum braking force; and/or the time of the maximum vertical acceleration.

These measures may be combined to form a measure of the probability of a time of impact (where all three conditions being met simultaneously has a high probability of indicating the time of an impact).

The vertical acceleration is also used in a first assessment of the collision severity, where large, or sustained, vertical acceleration indicates a severe collision.

To evaluate the velocities and displacements related to a collision, acceleration data is integrated (once for velocity, twice for displacement). As large time steps between data may result in inaccurate acceleration/displacement values being obtained, there may be a warning associated with the calculations where large time steps are present.

In some embodiments, velocities and displacements are also obtained using sensor data, where GPS data is used to obtain displacements, and speedometer data is used to obtain velocities. Such data may be combined with accelerometer data, where such a combination may be desirable as accelerometer data is often measured more often than other data—i.e. the GPS location may be recorded at a rate of 1 Hz, while acceleration data may be recorded at a rate of 100 Hz. To provide a smoother vehicle trajectory data from GPS and accelerometer can be interpolated. In some other examples, acceleration data is recorded at a rate of 10 Hz, 50 Hz, 100 Hz, 400 Hz, 500 Hz, or 1000 Hz.

In some embodiments, accelerometer data is used to obtain the changes in acceleration, velocity, and position after an impact, where initial values are obtained from other recording means, for example the initial velocity ($u_o$) may be taken from a speedometer reading.

In some embodiments, gyroscope data is used to improve accuracy of vehicle micro-movements by, for example, combining gyroscope data with accelerometer data using inertial tracking methods. Such a method allows the enhancement of impact and event detection methods to include consideration of vehicle rotation, and for details of this rotation to be included in further analysis.

Further, inclusion of rotation information allows treatment of the vehicle as a dimensional body which sustains impacts that have direction and magnitude and a position relative to the centre of mass of the body. This allows more precise characterisation of the impact on the vehicle, and a more precise estimation of the repair costs of such a vehicle.

This method may include a process for determining the sensor position relative to the centre of mass of the vehicle. This method may further include a process for estimating the moment of inertia of the vehicle, In some embodiments, the telematics data is used to detect partial or full inversions of the vehicle. This method may involve detecting changes in the direction of acceleration due to gravity or the integration of gyroscope data, or other analysis of the telematics or onboard diagnostic data.

Such events can feed into the damage estimation for the vehicle, in particular the damage estimate for the roof and windows, and hence improve the accuracy of repair estimations.

In some embodiments, said telematics data is used to detect skids or loss of traction events. This may involve methods for detecting differences in the vehicle heading (as defined by the forwards-backwards axis) and the direction of travel (as defined by the velocity/momentum). This may involve information from onboard diagnostics information, such as ABS signals, and steering, accelerator, and brake inputs.

Figure 6:
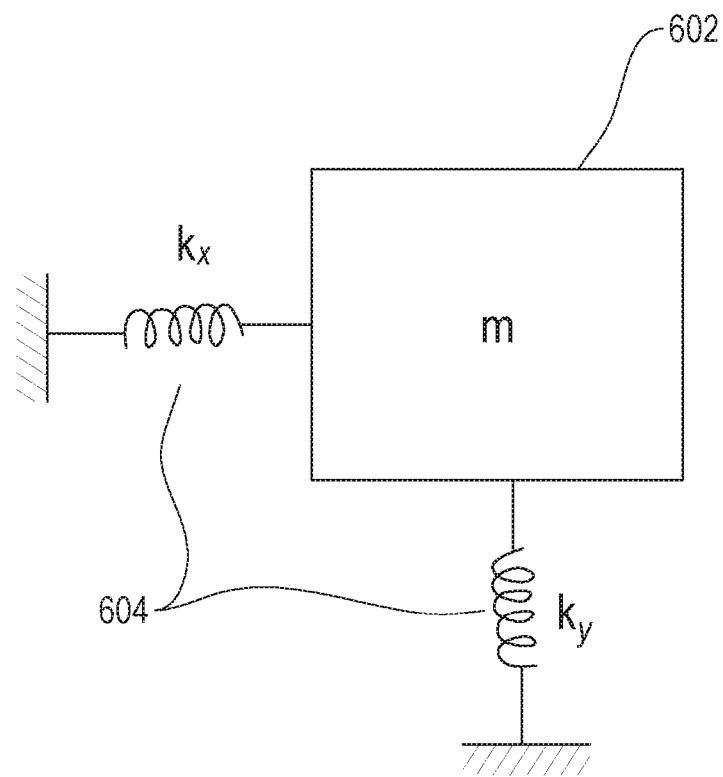
FIG. 6 shows an exemplary model of a vehicle.

FIG. 6 shows an exemplary model of a vehicle.

To represent elasticity, a vehicle is modelled as a mass 602 connected to one or more springs 604, where there are one or more springs in each direction of motion considered: e.g. a frontal collision may consider only longitudinal motion and use only one spring, a more complex collision may use three springs—longitudinal, lateral, and vertical. The springs each have a spring constant which is used to model the elasto-plastic behaviour of the vehicle during a collision.

Such a combination of springs may be used to represent the elastic behaviour alongside dampers, which represent energy dissipation. Preferably, a method is used where one spring is used in each direction, where these springs have different spring constants depending on whether they are being loaded (i.e. compressed) or unloaded, characterised by the loading stiffness $k_L$ and unloading stiffness $k_U$. There are three types of springs, depending on the value of $k_U$:

1. Elastic: When $k_L = k_U$, there is a perfectly elastic spring. The spring returns to its initial position with no energy dissipation;
2. Plastic: When $k_U = 1$, all of the energy is dissipated, there is no rebound and the final deformation is equal to the maximum deflection;
3. Elasto-plastic: When $k_U > k_L$, some of the energy is dissipated and the spring ends up with permanent deformation after rebound.

After each impact, the physical characteristics of the car change; hence any subsequent crashes need to be modelled using different loading and unloading spring constants.

Figure 7:
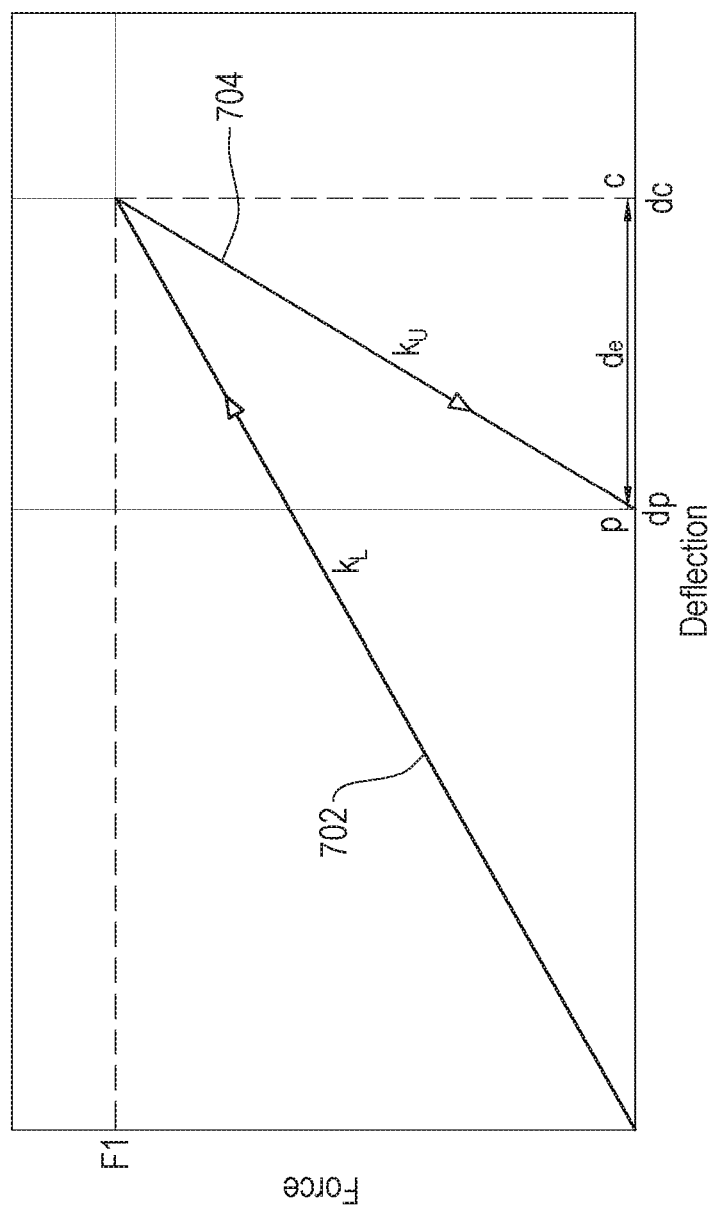
FIG. 7 illustrates the behaviour of a spring which may be used in the model of a collision.
Figure 8:
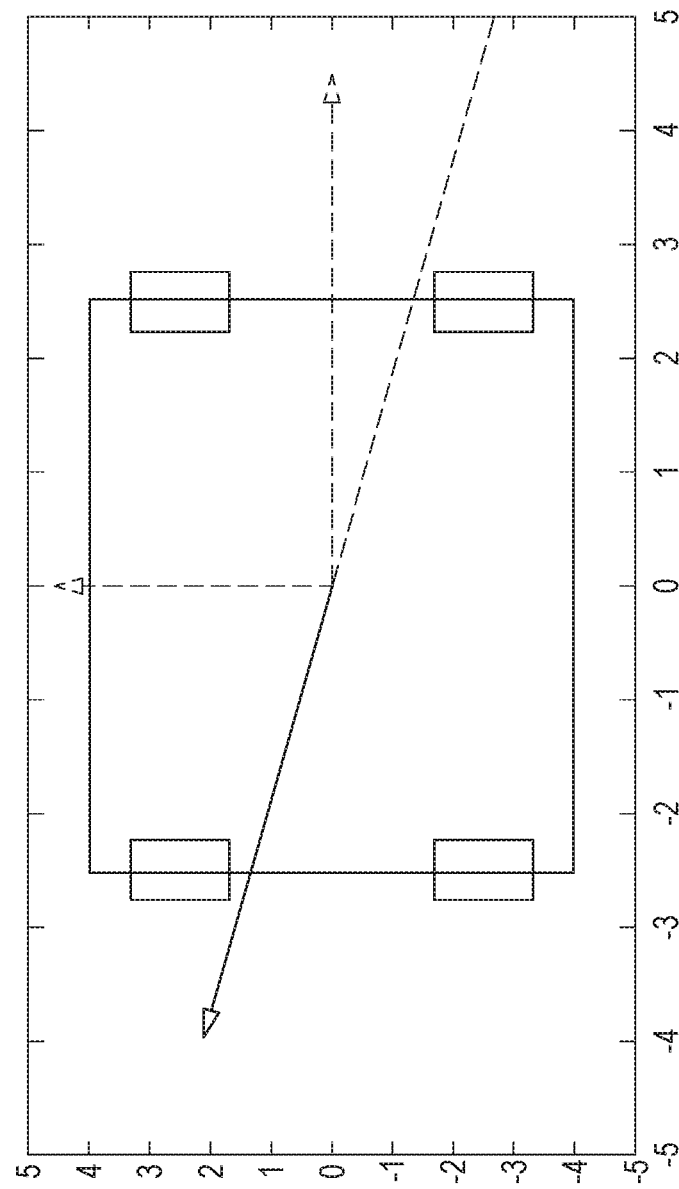
FIG. 8 shows an impact assessment based upon a spring model.

FIG. 7 illustrates the behaviour of a spring which may be used in the model of a collision.

The force on the vehicle caused by the collision, F, is decomposed into x and y components, $F_x$ and $F_y$, which act on the spring on the x and y axis respectively. For each direction i, Fi, the magnitude of the force for a single impact in direction i. is desired. Hooke's Law is used, where:

$$F_i = k_{L,i} d_{c,i}$$

where is the loading spring constant and $d_{c,i}$ is the compression displacement of the car body at impact. FIG. 6 shows a model for a single impact, where each side of the car is modelled as a spring system, where the spring is elasto-plastic and so deforms upon impact.

As shown in FIG. 7: the spring is first compressed 702 when force is applied, which causes compression displacement $d_c$. This force is then released 704, resulting in the elastic rebound displacement, $d_e$. As $k_U > K_L$ in this case, the impact results in a permanent deformation $d_p$ of length $d_c - d_e$.

To compute $k_{L,i}$ it is assumed that motion is sinusoidal, where:

$$s_i(t) = \frac{v_i^{imp}}{\omega_{e,i}} \sin(\omega_{e,i} t)$$

-continued $$\dot{s}_i(t) = v_i^{imp}\cos(\omega_{e,i}t)$$

$$\ddot{s}_i(t) = -v_i^{imp}\omega_{e,i}t\sin(\omega_{e,i}t)$$

where $s_i(t)$ is the displacement in the i direction, $\omega_{e,i}$ is computed as the frequency of the sine curve that is fitted to the impact (e.g. accelerometer) data, and $v_i^{imp}$ is the velocity at impact in direction i.

It is assumed that this frequency is the circular natural frequency, so that:

$$\omega_{e,i} = \sqrt{\frac{k_{L,i}}{m}} \Rightarrow k_{L,i} = \omega_{e,i}^2 m$$

where m is the mass of the vehicle.
The total crash impact is calculated by:

$$\Delta E_i = \tfrac{1}{2}k_{L,i}d_{c,i}^2 = \tfrac{1}{2}m(v_i^{imp})^2 - \tfrac{1}{2}m(v_i^{postimp})^2$$

where $v_i^{postimp}$ is the velocity after impact in direction i. Therefore:

$$d_{c,i} = \sqrt{\frac{m(v_i^{imp})^2 - m(v_i^{postimp})^2}{k_{L,i}}} = \frac{\sqrt{(v_i^{imp})^2 - (v_i^{postimp})^2}}{\omega_{e,i}}$$

and:

$$F_i = m\omega_{e,i}\sqrt{(v_i^{imp})^2 - (v_i^{postimp})^2}$$

where $F_i$ is the force exerted in the i direction at impact. The force calculated here is used as a measure of the severity.

The angle of a collision can be estimated by:

$$\tan(\theta) = \frac{F_y}{F_x}$$

where the co-ordinate system is chosen to obtain a sensible angle (preferably the x and y directions are equivalent to the longitudinal and lateral directions of the vehicle).

This model allows an estimate of collision severity with no knowledge of the properties of other vehicles involved in a collision. If these other vehicles properties are known the calculations may be improved by including these properties, or by calculating effective elasticities for the other vehicles involved.

The severity may be expressed as a numerical measure, for example a force in Newtons, or an energy in Joules, or as a category of severity e.g. an insurance company may specify severities as 'high', 'medium', and 'low'.

In some embodiments, multiple impacts are modelled. To model two impacts on the same side, an unloading spring constant $k_{U,i}$ is also needed, and is obtained by computing:

$$k_{U,i} = \frac{(v_i^{imp})^2 k_{L,i}}{(v_i^{postimp})^2}$$

Figure 9:
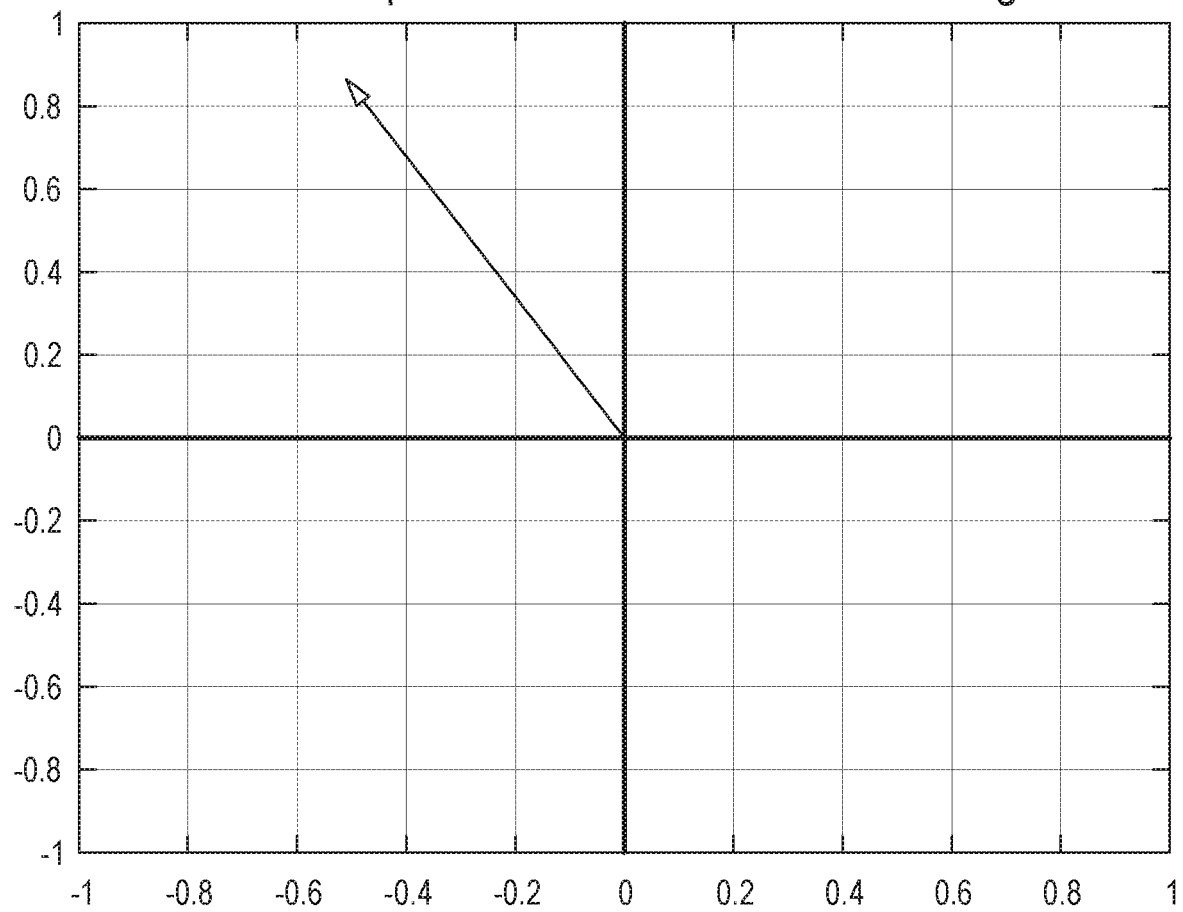
FIG. 9 displays an impact assessment based upon a momentum vector.

FIG. 9 displays an impact assessment based upon a momentum vector.

To evaluate a collision, for example a momentum method may be used. The change in the momentum of a vehicle around the time of an impact relates directly to the size of the force of that impact, and the direction of the momentum change relates to the zone of impact. These properties are determined by calculating the motion of the car in a small time period, which includes the time of impact, as a momentum vector. The magnitude of this vector can then be used as a measure of the impact force or crash severity.

$\Delta p$, the momentum change of the vehicle, is calculated as:

$$\Delta p = \int_{t_{imp}-\epsilon}^{t_{imp}+\epsilon} ma\, dt$$

where: $t_{imp}$ is the time of impact, $\epsilon$ is a small time (so that $\epsilon$ to $t_{imp}+\epsilon$ defines a small time window around the impact time), m is the mass of the vehicle, and a is the acceleration (from accelerometer data).

The magnitude of the momentum vector is calculated as:

$$|\Delta p| = \sqrt{\Delta p_x^2 + \Delta p_y^2 + \Delta p_z^2}$$

where $p_x$, $p_y$, and $p_z$ are the components of momentum in each direction. This magnitude is used as a measure of crash severity. The zone of impact is obtained by rotating the momentum vector 180°.

In some embodiments multiple models are used to evaluate a collision. Contrasting outputs, for example where the models disagree on the severity of a collision may result in a more in depth investigation.

In some embodiments, the calculations used depend upon the data collected, so that a simplistic calculation based on a simplified model of the collision is used when data is scarce, and a more accurate calculation based on a complex model, for example taking into account the properties of the other vehicles involved, is used when more data is available. A simple calculation is then used for an initial damage estimate, while a more detailed calculation is used, if necessary, to obtain a more detailed reconstruction, which may be desirable when considering liability.

FIG. 10 displays recorded GPS data, which may be used in a collision evaluation.

Figure 10A:
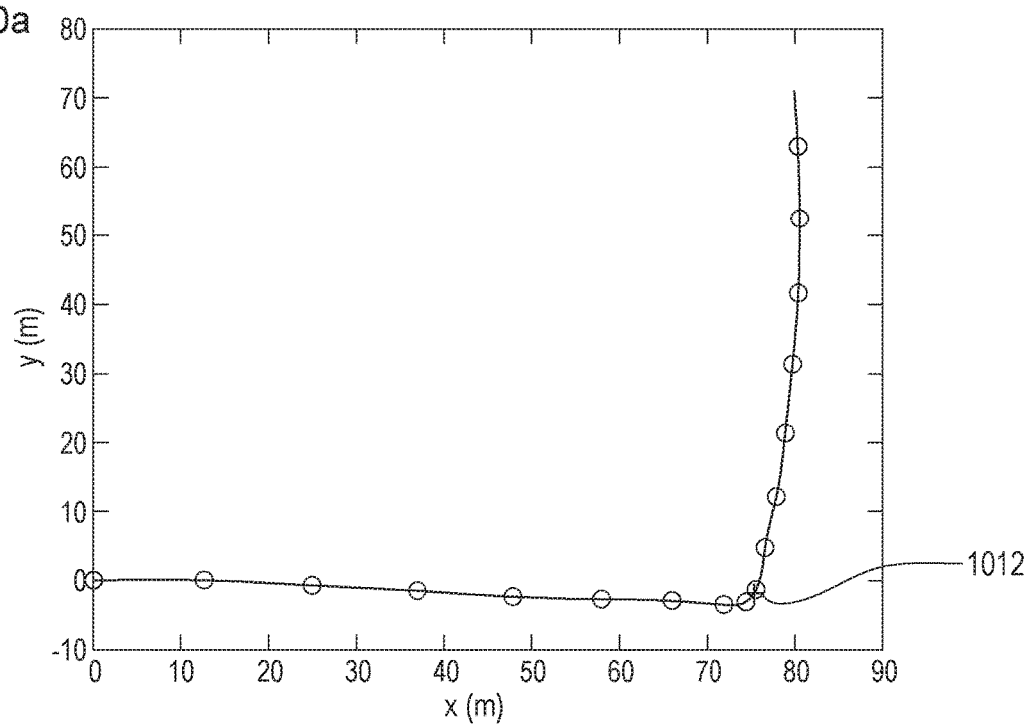
FIGS. 10a and 10b display recorded GPS data, which may be used in a collision evaluation.

FIG. 10a displays a GPS track obtained from recorded data.

An indicator 1012 indicates the time of the collision: it can be seen that a large y displacement occurred immediately after the collision, suggesting a significant side-on impact.

Figure 10B:
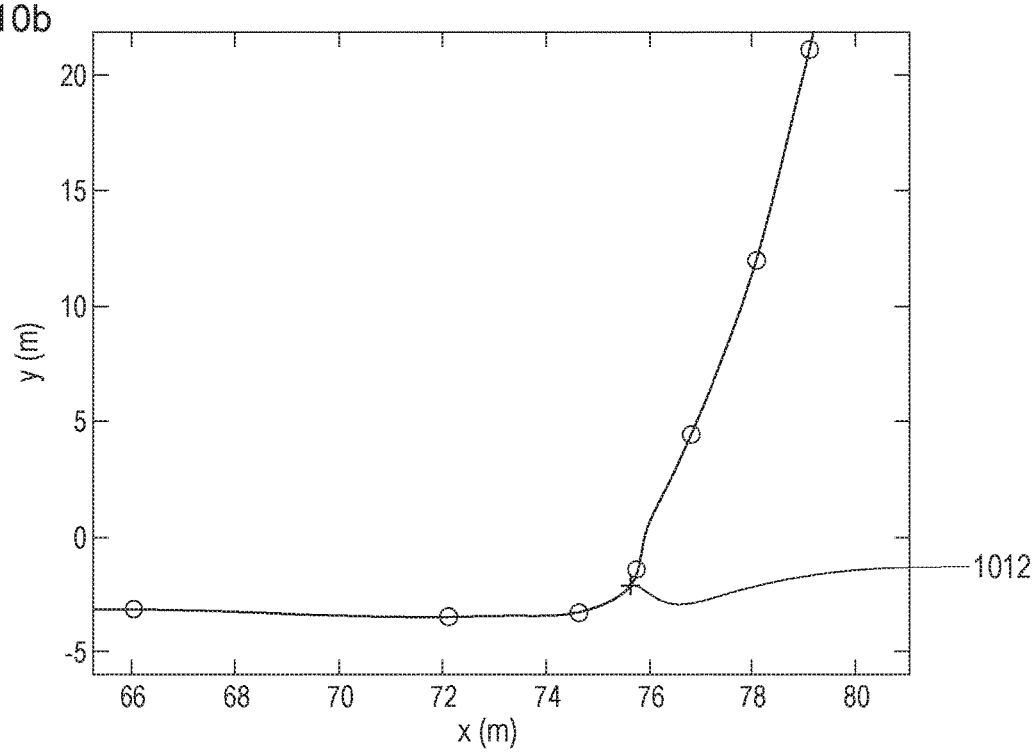

FIG. 10b displays the same data, with a focus around the time of the accident.

This graph shows that the vehicle was likely turning before the collision occurred.

In some embodiments, a collision evaluation uses a supervised learning algorithm, whereby recorded data is used to estimate the severity and location of any impacts based upon historical collision data—such recorded/historical data may comprise accelerometer and speed data, as well as information about the vehicles involved in the collision (e.g. model, year of production). Such an algorithm may increase in accuracy as more data becomes available, and may be used alongside another method, such as those described herein, until reaching an acceptable level of accuracy.

Damage Assessment

The make and model of the vehicle is known based on pre-existing insurance information, or can be determined from a database look-up of the registration number. In such a way, a full component list of the vehicle, along with where in the vehicle each part is located, can be created.

The damage calculation considers the severity and the direction/location of the force, where the components of the car are damaged in a certain order, for example: in a frontal collision a threshold severity is required before the bumper is damaged, and a higher threshold severity measure is required before the headlights are damaged, and then it may be the bonnet (hood), windscreen, and eventually a very high severity would cause structural damage to the chassis.

Crumple zones, or zones comprising reinforced components, protect the components behind these zones. Thus, a higher severity collision threshold would need to be met before such protected components are considered damaged.

Historical data from similar vehicles being involved in similar collisions may be queried so as to determine a likely list of parts that would require repairing or replacing.

A trained classifier may be employed to determine the extent of the damage, and thus produce a more accurate prediction of which parts would likely require replacing. The training data comprises information regarding historical collisions and the parts which required replacing. The historical information can then be used to create a model to determine which parts would be required to be replaced given information regarding a collision. Such a model may comprise adjustments to threshold levels for when different parts are damaged, or may be more complex—for example inferring interactions between components (e.g. when the windscreen breaks, there is typically some damage to the fabric of the passenger seat).

The trained classifier in one example comprises a neural network. The training may be 'supervised' whereby a user provides feedback to the trained classifier's output so as to improve the model produced. Alternatively, the training may be 'unsupervised' whereby the trained classifier produces a model which reduces a given cost function (e.g. mean-squared error).

A measure of damage related to which components are damaged is also calculated: structural damage, for example to the chassis, is considered more serious that superficial damage to a bumper. Suspected damage to certain components, such as the fuel tank or brakes, generates an output where it is indicated that continued operation is unsafe and an evaluation by a mechanic is required. Such a measure also includes information about the number of components damaged, and the locations (so that a damage penetration is estimated).

The parts damaged, and corresponding repair costs and times, are then determined for each vehicle. Such a determination uses either publicly available cost data, as may be obtained using the internet, or data available to, for example, insurance companies, which have relationships, and discount deals, with part producers. Labour costs, and repair times, are estimated using previous repair data, where these estimations may be improved by contacting a repairer.

In some embodiments, following a collision, information regarding predicted damage may be transmitted to a mechanic, where this mechanic is able to give a quote based upon this damage.

Third Party Liability

It is possible to infer likely liability by using properties of other vehicles involved in the collision. The speed, mass and direction of the vehicle with the telematics data is known, as is the impulse received during the collision. Therefore, the momentum of the other vehicle can be calculated. If the mass of the other vehicle is known, an estimate of the other vehicle's velocity (speed and direction) can be generated.

The mass of the other vehicle can be determined by obtained the registration number of the other vehicles involved, from which the make and model can be determined. The operator of the vehicle may be requested to provide details of the other vehicles involved in the collision, or may be retrieved from a report issued by any party, such as a police report.

The velocity of the other vehicle(s) at the time of the collision is important in determining which party(ies) are responsible or liable for the collision, for example: the calculations may determine that one party was speeding, or stored GPS/video data may indicate that one party crossed onto the wrong side of the road.

Information from external sources, including the highway code, case law, and mapping information, may be used in combination with telematics data and onboard diagnostics. This may include methods for automatically classifying roads and junctions based on mapping data to determine right-of-way. This may include methods for determining the lane a vehicle is in, and any lane-change manoeuvres. This may include methods for determining manoeuvring intent of a vehicle. This may include methods for distinguishing reversing movements from forwards movements. These methods may also be applied to third-party vehicles colliding with a vehicle recording telematics data.

The data (recorded and calculated) from telematics data from a single vehicle can therefore be used to create a comprehensive (albeit estimated) model of a collision with an effectively instant indication of repair costs and potential liability.

A similar repair cost exercise can be undertaken with each vehicle involved in the collision so as to determine an estimate of the total claim value.

Personal Injury Claims

The data obtained is also used to assess the likelihood, and the type, of injuries being sustained. In particular, the accelerations measured are used to estimate the probability of whiplash. A combination of direction and magnitude may be appropriate in determining whether or not a collision would result in a whiplash claim. For example, a 'rear shunt' may more likely result in a whiplash claim than a side collision having a similar magnitude.

The calculations can be used to combat fraudulent claims, where, for example, low measured accelerations can be used as evidence against whiplash claims. The decision to contest a potentially fraudulent claim is likely to depend upon the value of the claim and a probability of fraud: this decision may be made automatically or with some input from an insurance agent, where it may be preferable to settle smaller claims with minimal agent input. For example, a claim where an unexpected injury is included, or where a much higher than estimated injury cost is claimed, triggers a notification, where an agent is informed that there is a possibility of fraud.

When determining the monetary size of potential claim, precedent from historical claims may be used—for example if it is determined that the occupants in a vehicle would likely have suffered whiplash, the claim may be an average of previous whiplash claims multiplied by the number of occupants in the vehicle.

However, a more intelligent method may be employed whereby a more accurate personal injury claim may be calculated by utilising more information relating to the crash.

In one example, the historical injury claims may be filtered so as to be more representative of the collision in question. Such comparable information may include information such as the make and model of vehicles involved, the location and severity of the collision (e.g. based on accelerometer data), or whether or not airbags were deployed. It would be possible to filter down using as many collision features as are available until the number of historical cases become statistically insignificant.

In another example, a trained classifier may be employed to quantify the likely level of compensation. In such an example, the trained classifier may be fed historical cases as training data and in such a way build up a model of how features of a collision affects the personal injury compensation awarded.

The trained classifier in one example comprises a neural network. The training may be 'supervised' whereby a user provides feedback to the trained classifier's output so as to improve the model produced. Alternatively, the training may be 'unsupervised' whereby the trained classifier produces a model which reduces a given cost function (e.g. mean-squared error).

Write Off/Repair Determination

The repair costs calculated are used to assess the relative cost of repair and replacement, so that a collision where repair costs (calculated as described above) exceed replacement costs results in a vehicle being immediately scrapped. A replacement cost can be determined from information known about the vehicle such as make, model, year, mileage etc.

By using an evaluation to immediately predict a claim cost, insurance companies can achieve savings by only investigating collisions where a certain pay-out is demanded, or where there is a high chance of fraud. This saves the additional costs of involving numerous parties, such as insurance agents, mechanics, and doctors, in otherwise low value claims.

An immediate claim evaluation also enables an insurance company, and a vehicle operator, to plan accordingly for an eventual claim, for example by setting aside an amount of money or renting a replacement vehicle for an appropriate amount of time.

Post-Evaluation Actions

Figure 11:
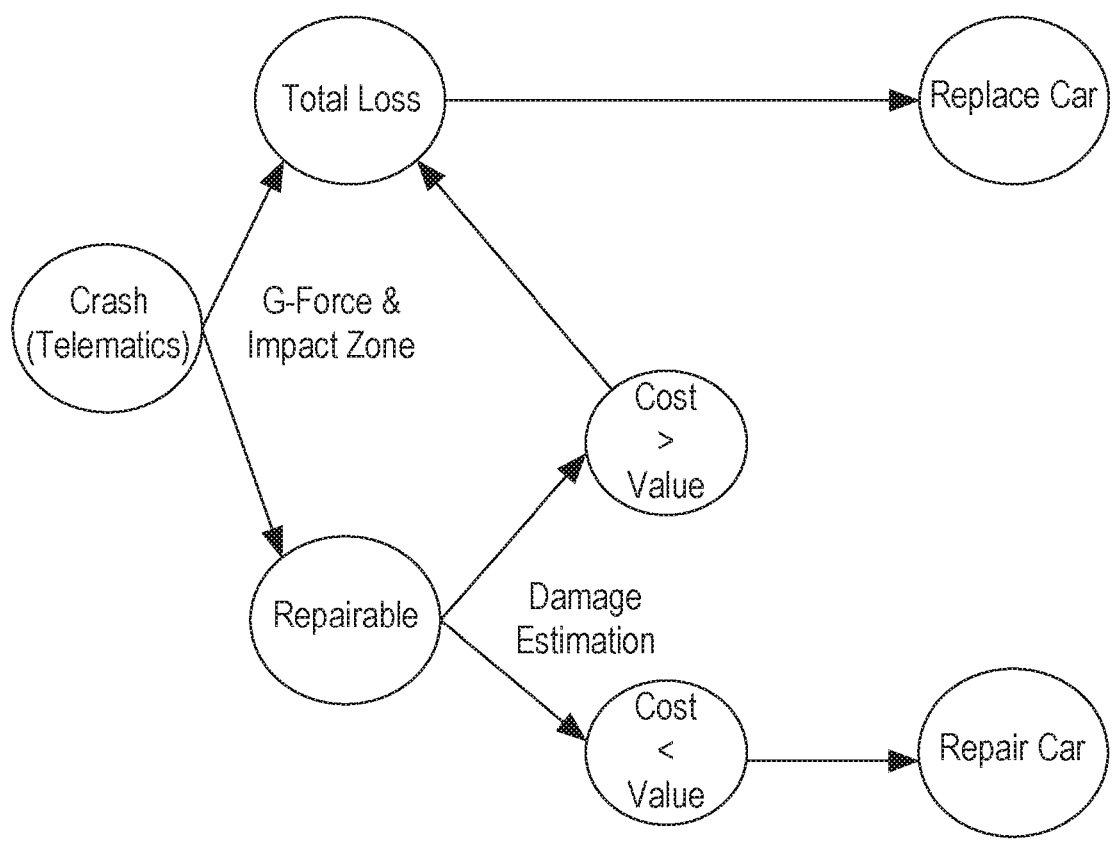
FIG. 11 shows a flowchart for determining whether repairing a vehicle is cost-effective.

FIG. 11 shows a flowchart for determining whether or not repairing a vehicle is cost-effective;
1. A crash is detected and evaluated: from this evaluation it is determined that the car is either a total loss or repairable.
2A. A collision which causes a total loss leads to the car being replaced. This is typically where the collision severity is above a certain threshold.
2B. A collision where the damage caused is repairable is evaluated to determine whether the cost of repair is greater than the value of the car.
   The value of the car may be that available at any car dealer, or there may be a reduced value available to an insurance company.
3A. If the cost of repair is greater than the value of the car, the car is replaced.
3B. If the cost of repair is less than the value of the car, the car is repaired.

Figure 12:
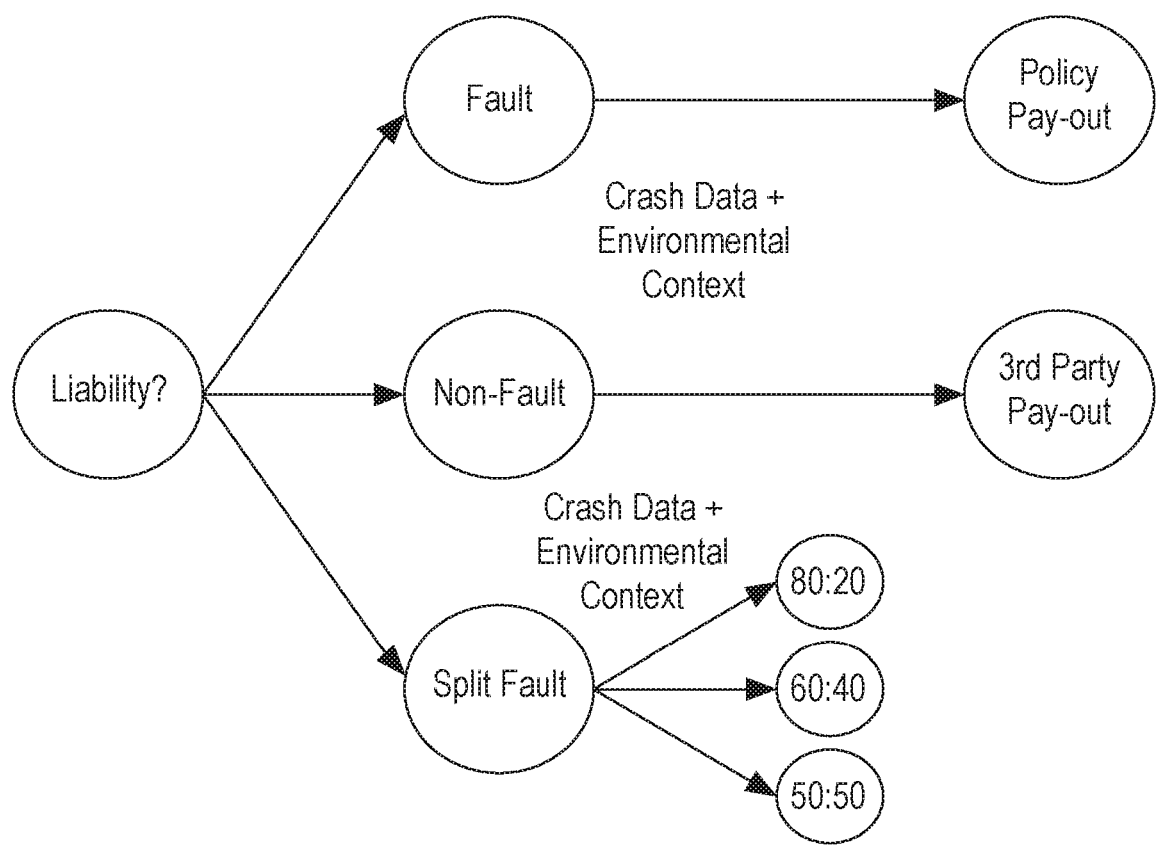
FIG. 12 shows a flowchart for determining pay-outs after a collision.

FIG. 12 shows a flowchart for determining compensation following a collision.
1. A collision is evaluated to determine liability.
2A. If the vehicle containing the data recording means is at fault, the policy pays out to each party involved.
2B. If this vehicle is not at fault costs are recovered from a third party (such as another vehicle's insurer).
2C. If the fault is split then a split pay-out occurs as suitable given the liability split.

Figure 13:
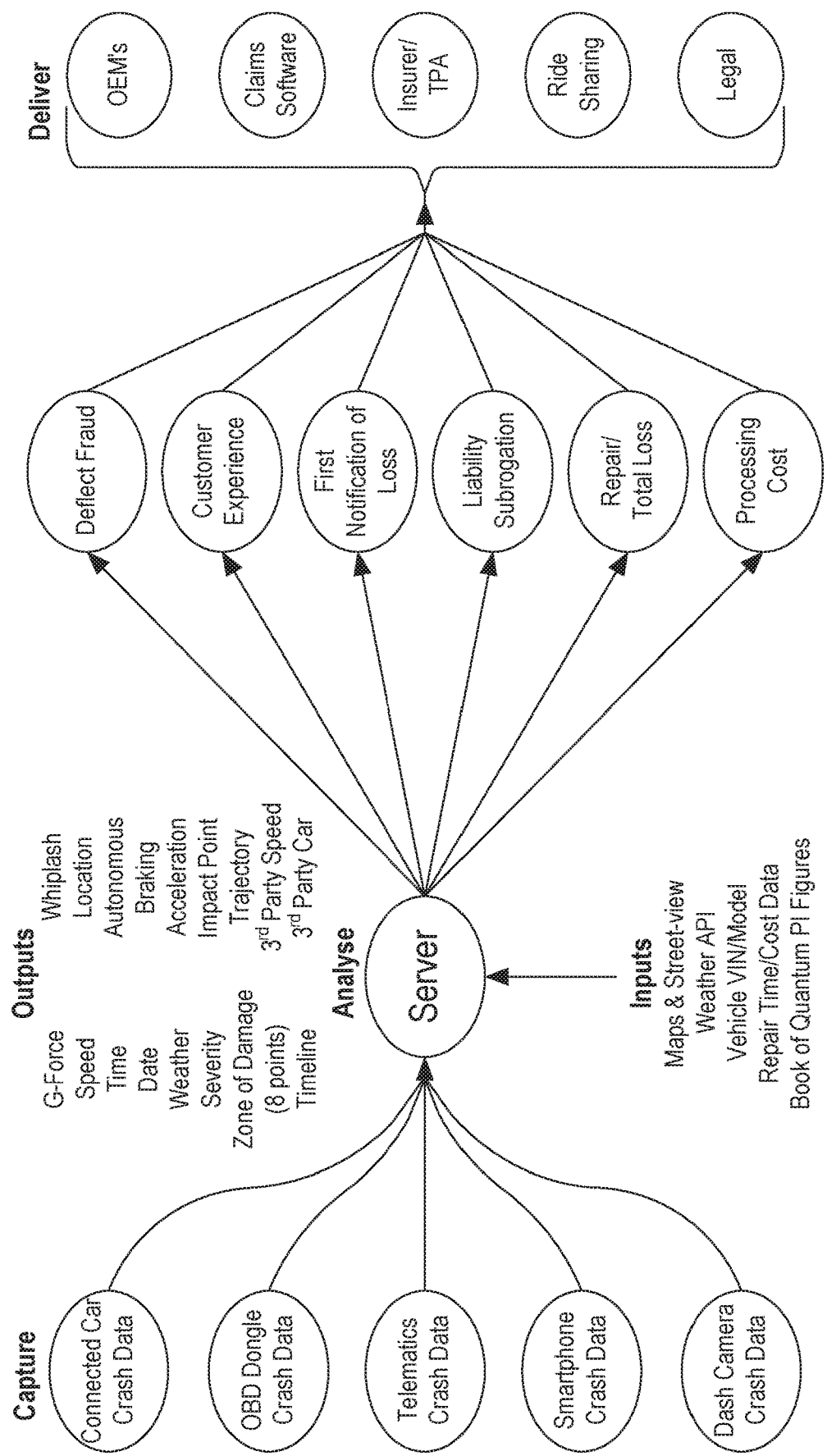
FIG. 13 shows a flowchart illustrating the transfers of data related to a collision evaluation.

FIG. 13 shows a flowchart illustrating the transfers of data related to a collision evaluation.

Once a vehicle collision is detected, a range of sources of data are used to record and store data related to this condition, where this data is then transmitted to a server.

The recorded data is used alongside other input data, such as a book of Quantum Personal Insurance (Quantum PI) Figures to evaluate the vehicle collision, where this evaluation partially comprises assessing the severity and locations of any impacts and calculating a number of outputs.

These outputs are used to provide information related to the collision, such as an estimate of costs, and a determination of liability. This information can be sent to one or more parties, which use the information, for example: to quantify insurance pay-outs.

Figure 14:
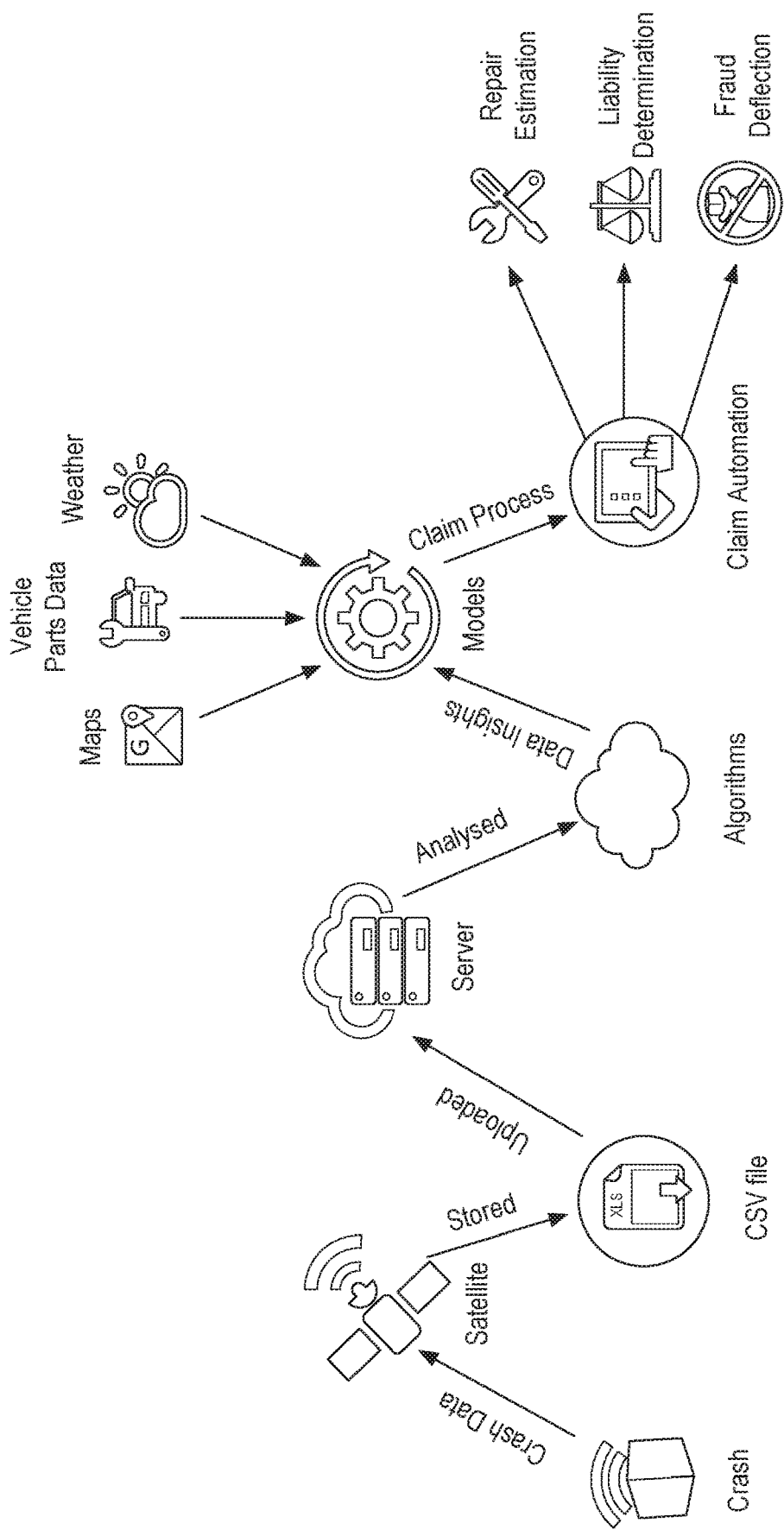
FIG. 14 shows a detailed example of the transfer of data related to a collision evaluation.

FIG. 14 shows a detailed example of the transfer of data related to a collision evaluation.
1. A collision is detected.
2. Collision data is sent (via satellite) to a server in the form of a comma separated variable (CSV) file.
3. The collision is evaluated using suitable algorithms alongside other data (location data, recorded vehicle data, and contextual data—such as weather) to create a model of the collision.
4. The data obtained using the model is used to predict a claim.
5. This predicted claim data is then used for: determination of liability, estimation of repair costs/time, assessment of potential fraud.

In an example liability is inferred by extracting relevant facts from the telematics data and processing that data via a cognitive reasoning model. The model can include information on a pertinent highway code, case law, and mapping information. Examples of factors that can be accommodated by the model to determine liability include:
   classifying roads and junctions based on mapping data to determine right-of-way;
   determining a lane a vehicle is in, and any lane-change manoeuvres;
   determining manoeuvring intent of a vehicle; and
   distinguishing reversing movements from forwards movements.

Where further information is required the relevant questions can be dynamically presented to a user. Upon determination of a possible liability outcome, the supporting data can be compiled to provide evidence supporting the liability determination. This can enable objective analysis of liability and minimise the risk of fraud or human error.

Collision Evaluation Interface

Once a collision has been detected and the initial, automated, evaluation has been performed it may be necessary to analyse the data in greater detail, where any anomalies are detected and a liability determination is performed. In order to simplify and improve the accuracy of such a process an interface is disclosed where an agent is able to view the events preceding the collision, as well as the collision itself, alongside contextual information. This enables the agent to understand quickly how a collision occurred, and how injuries/vehicle damage may have been caused.

Figure 15:
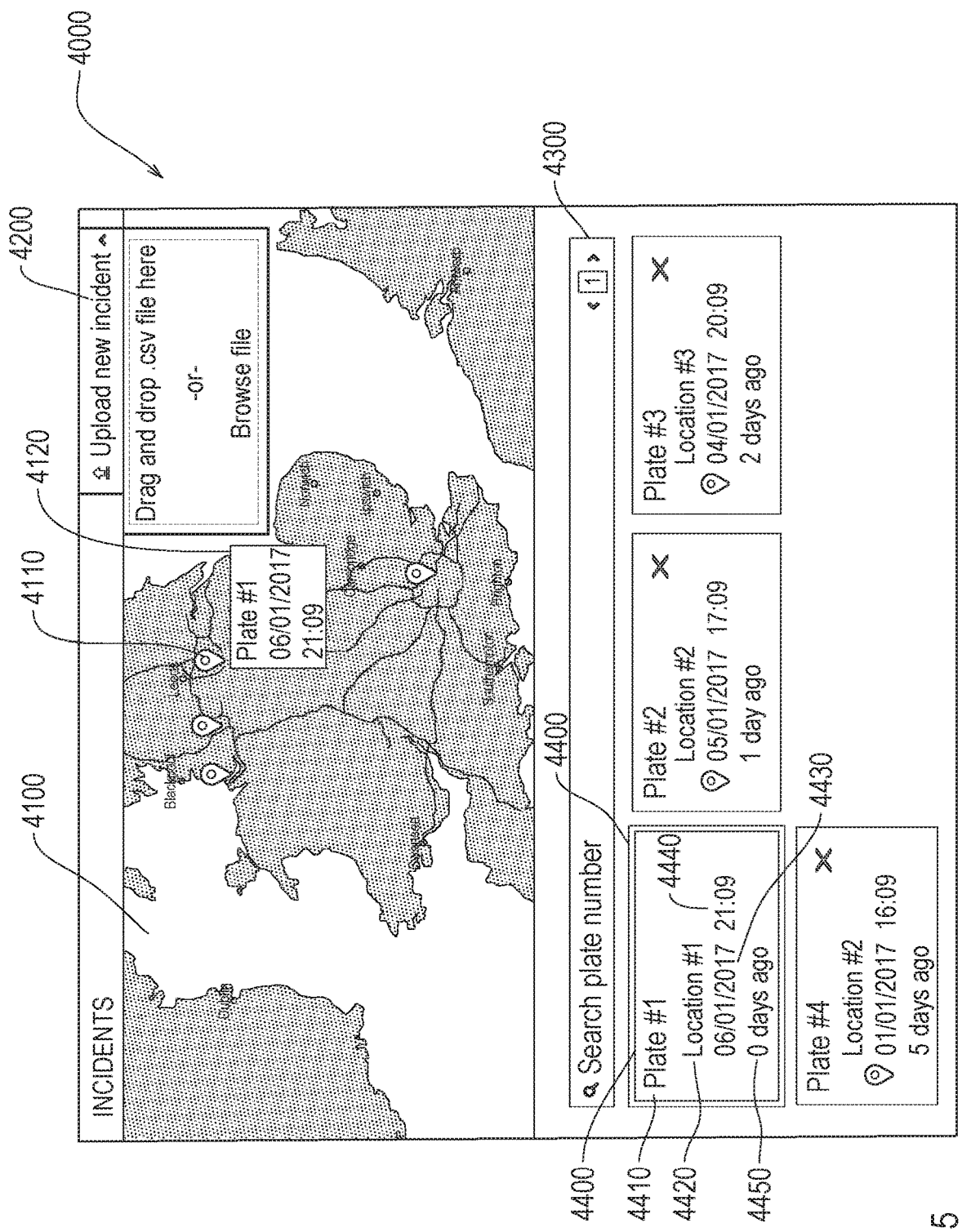
FIG. 15 shows an interface which is used to view data corresponding to multiple collisions.

FIG. 15 shows an interface which is used to view data corresponding to multiple collisions.

The interface 4000 may be integrated with existing insurance software, for example as a plugin, or may be provided as a standalone program, or web service. This interface is able to receive data from existing services and existing databases, where insurance companies may have existing data recording devices which are used to record data.

The interface 4000 is displayed to an agent, where within this interface:

A map 4100 is displayed where markers 4110 are superimposed upon this map. These markers are related to collisions.

This interface can be used by an agent to view multiple collisions, where a selection list is used to limit the incidents shown, for example collisions are filterable by date, location, or cost. Colour coding is used for the markers, where this colour relates to a feature of the collision, for example collisions within the last week are a different colour to older collisions.

An uploader 4200 is provided to upload new incident data, for example by dragging a file onto the window or browsing through computer files and selecting a collision data file. Certain pieces of information are required, for example it is not possible to upload a file without a vehicle identifier (e.g. a registration number). If such an upload is attempted an error notification is transmitted to the party attempting the upload.

Preferably, uploading occurs automatically, where, upon a collision: a data file is automatically transmitted from the recording means and received by a server. An agent apparatus checks the server upon events (such as an agent logging in), and/or at predetermined periods, to detect newly received collision data and load this data into an interface 4000.

In some embodiments, there is a standard file format, where, for example, units are standardised so that indications of units are not needed (i.e. all speeds are in miles per hour, so that speed data only contains digits). Data may be required to be in such a format before being uploaded, or data may be converted to this format upon being uploaded.

Further information about each collision is given: items 4400 containing information such as registration plate number 4410, location 4420, date 4430 and time 4440, and a measure of the age of the collision 4450 are displayed. Other pieces of information may be shown, where the agent is able to select which pieces of information are shown.

The collision markers and items are selectable, whereby the related item is shaded, the marker also changes colour. A box containing information 4120 related to this selected collision appears by the relevant marker upon selection, so that an agent is able to simply identify the collision item corresponding to each marker.

A searching box 4300 is provided, where this allows an agent to filter the incidents displayed. The incidents are filterable by any recorded/calculated feature or combination of features of a collision.

FIG. 16 show different aspects of an interface for viewing events leading up to and including a collision.

Within the interface 4000, an agent is able to select a collision to view in detail.

Figure 16A:
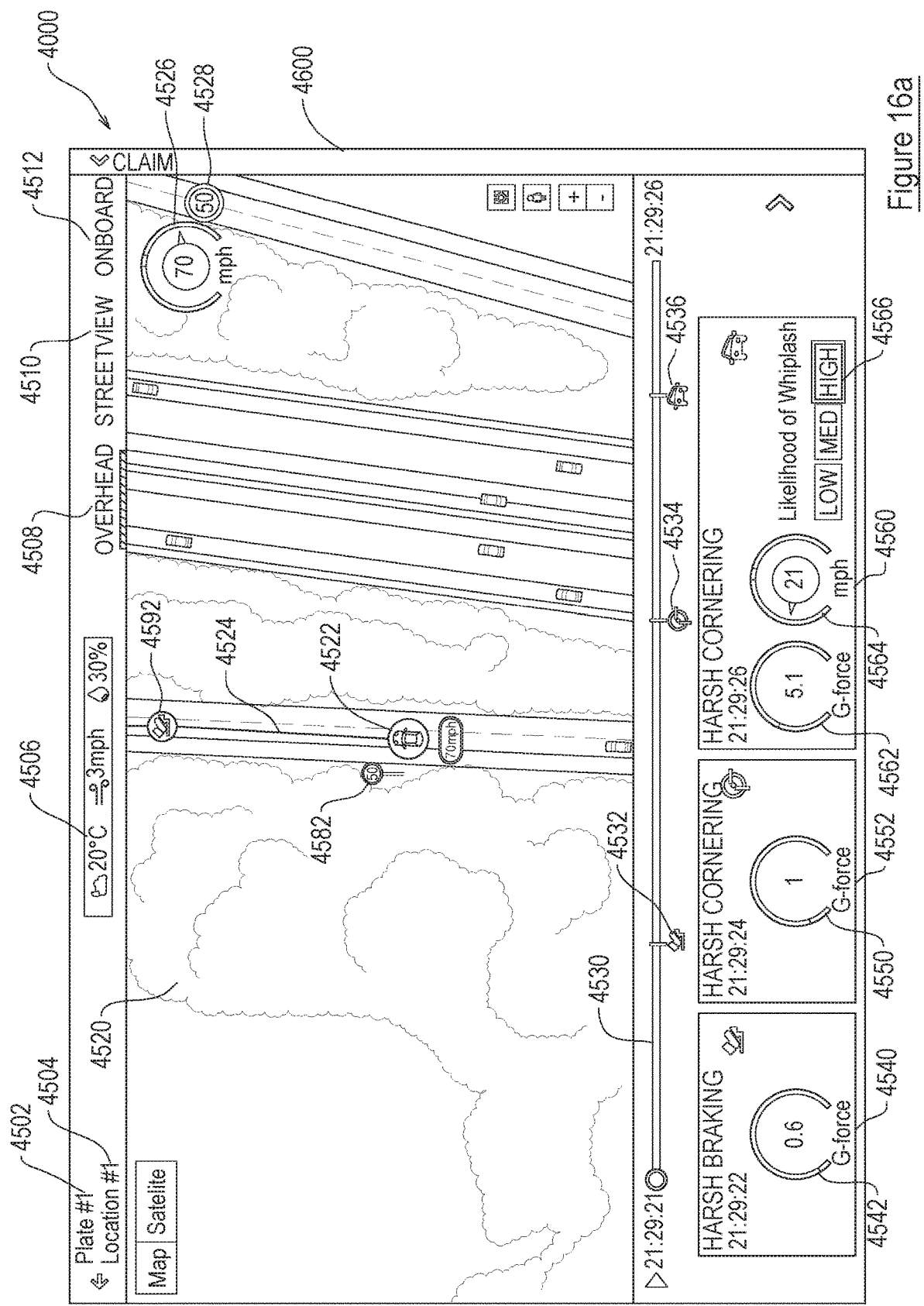
FIGS. 16a, 16b, 16c and 16d show an interface for viewing events related to a collision.

FIG. 16*a* shows a view of the interface 4000 where the situation at the start of data recording is displayed.

Within the interface 4000:

An identifier 4502, here a vehicle registration number, is displayed: this indicates which collision is being viewed. Further contextual information, such as the location 4504 of the collision and the weather conditions 4506 at the time of the collision is also shown.

Various views of the collision scene are viewable, such as an overhead view 4508, a 'streetview' 4510 (a ground level view), and an onboard view 4512. In this embodiment, the means for selecting the onboard view selection is disabled, where it is 'greyed out' to indicate that an onboard view is not available. The onboard view is available only if the vehicle involved in the collision has a dashcam, or other image/video recording means installed.

Where an on-board video is available, this is viewable as a video, or as timestamped frames, optionally alongside another view, where relevant frames (those related to an event) are automatically detected.

There is an indication of which view is selected, such as a coloured/bold font or underlined.

The selected view is displayed 4520. This view is preferably obtained from one or more third party mapping services, such as Google Maps™ or DigitalGlobe™.

A representation of the vehicle 4522 involved in the collision is superimposed upon the displayed view 4520. Information about the current properties of the vehicle, such as the speed, is shown alongside the representation of the vehicle. Also shown is an indicator of the path 5424 of the vehicle.

The path 5424 is based upon recorded/stored and calculated data, where the recorded GPS locations may be used alongside accelerometer data to obtain a predicted vehicle path.

Millisecond resolution of the recorded/stored and calculated data (potentially by extrapolation or other fitting procedures) can enable micro-movement of the vehicle to be computed and overlaid onto mapping software.

This path 5424 is adjustable, either by the agent or automatically. Such an adjustment may be desirable if there is suspected to be an error in the GPS data received, for example if this data seems to indicate that a car was travelling through a forest next to a road. The agent is able to adjust the recorded GPS track to obtain a more probable path. This path may 'snap' to a road—i.e. when a path is altered an apparatus may detect a fit whereby each point along the path relates to a point on a road suggest such a placement. There would then be displayed an indicator, to show that a path adjustment had been performed.

An indicator 4582 of the speed limit of the road, and the location from which this speed limit is in place, is displayed on the selected view 4520.

A means of displaying the vehicle speed 4526 is shown alongside an indication of the speed limit 4528 of the road upon which the vehicle was travelling at the time being viewed.

The indication of the speed also shows an indication of safe/dangerous speed ranges, for example using a variable colour scheme. A 'dangerous' speed may be considered to be a speed greater than the legal limit, or greater than a percentage above or below that limit.

In some examples, a determination of dangerous speed also considers other features of the journey: rain, bends in the road, or nearby intersections reduce the maximum safe driving speed, so that the 'dangerous' driving speed is below the legal limit.

A timeline 4530 displays a period preceding and/or following the collision along with indications 4532, 4534, 4536 of the times of events. The events are selected based on the data recorded, for example: a g-force threshold being passed, an operator making a phone call, an operator interacting with the vehicle (e.g. braking), or a vehicle turning onto a new road.

The location of each event is displayed as a symbol on the vehicle path 4522, here the location 4592 of 'harsh braking' is displayed.

Further information related to each event is shown below the timeline, where each event is displayed in a separate item 4540, 4550, 4560. Information 4542, 4552, 4562, 4564, relevant to the events is contained within these items. An indicator of an outcome of the collision is shown, here the likelihood of whiplash 4566. Other outcome information, such as a repair cost, or an indication of liability may also be displayed here.

These events are selectable (for example by clicking the items 4540, 4550, 4560 with a computer cursor), where such a selection displays information about the event and a representation of the event.

There is also provided a scrolling means 4570, where using this scrolling means selects the event chronologically following the currently selected event, in this way an agent can scroll through the events preceding, and following a collision.

An expandable claim window 4600 is provided which is used to view information about a possible claim. This is described in more detail in later sections of the description.

This claim window 4600 being expandable enables an agent to first view information related to a collision, in order to better understand liability, before viewing information related to a claim. The expandable claim window 4600 may cover the whole interface 4000, or only a section, so that the agent is able to view claim information alongside a display of the impact (to better understand how any damage/injury was sustained).

Figure 16B:
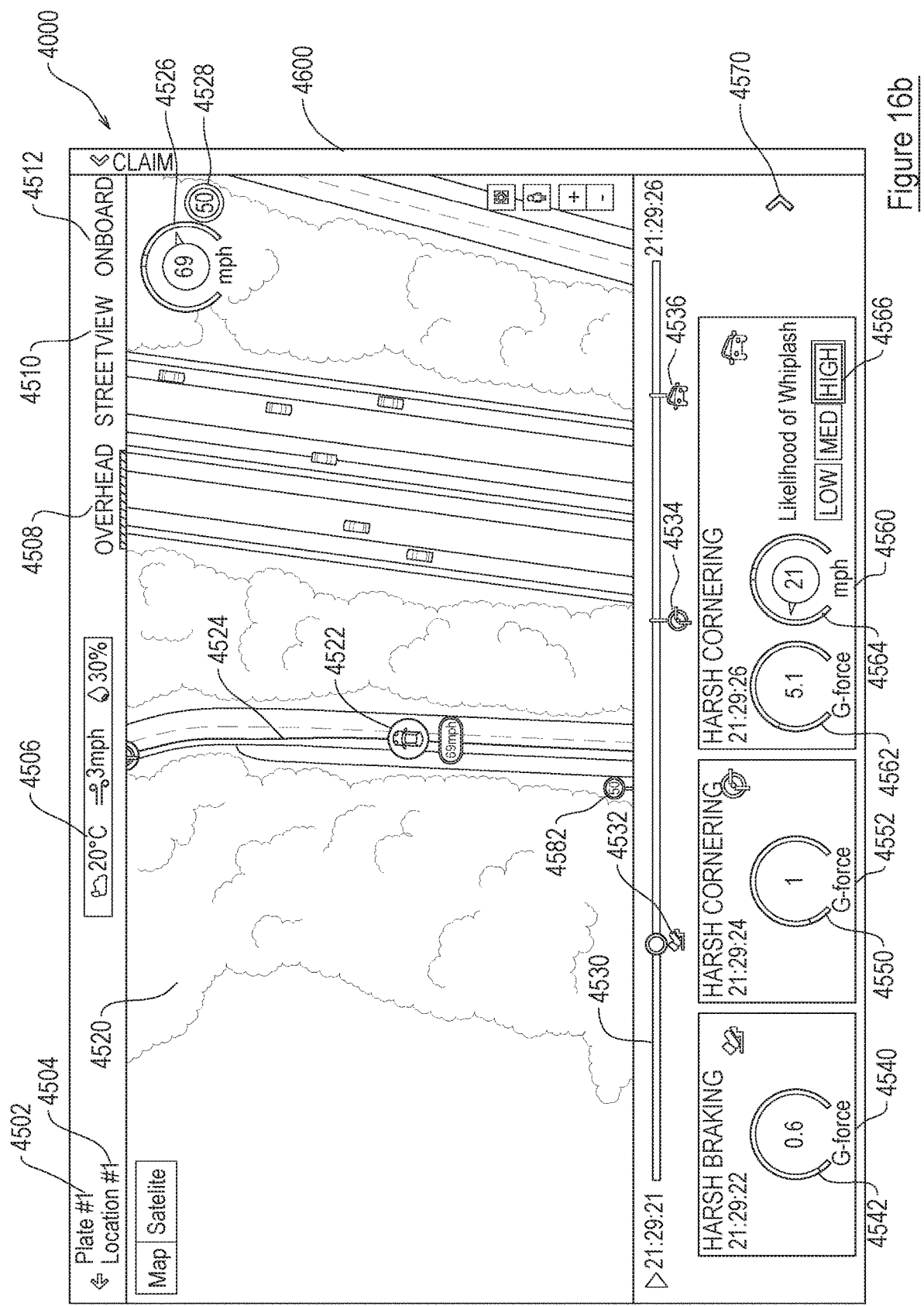

FIG. 16b shows a view of the interface 4000 when the first event (harsh braking) is selected.

The map 4520, the position 4522 of the vehicle, the properties of the vehicle, here the speed 4526, the situational context, here the speed limit 4528, and the timeline 4530 are updated within the interface, so that the values of these features relate to those at the time of the (hard braking) event. The event selected 4540 is highlighted.

Figure 16C:
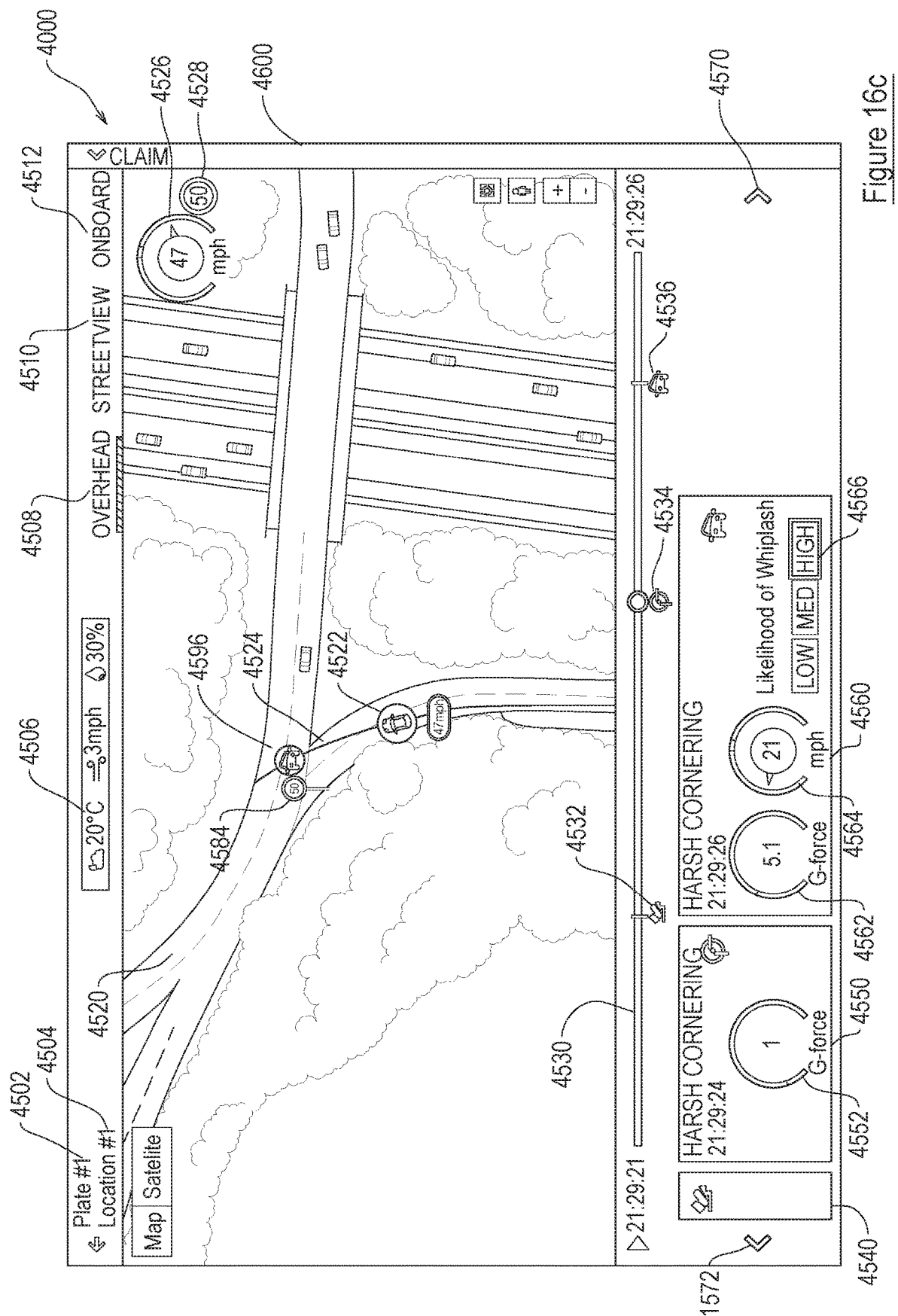

FIG. 16c shows a view of agent interface 4000 when the second event (harsh cornering) is selected.

As before all aspects of the interface are updated. The item events are also updated, so that the item 4550 for the second event is minimised (as it occurred before the event selected). There is presented an additional scrolling means 4572, which enables selection of chronologically view previous events.

A speed limit indicator 4584 is displayed within the selected view 4520, where it is 'greyed out' to indicate that the vehicle has not yet reached the area where this limit applies. The current speed limit is also displayed 4528.

The location 4596 of impact is displayed on the path 4524.

Figure 16D:
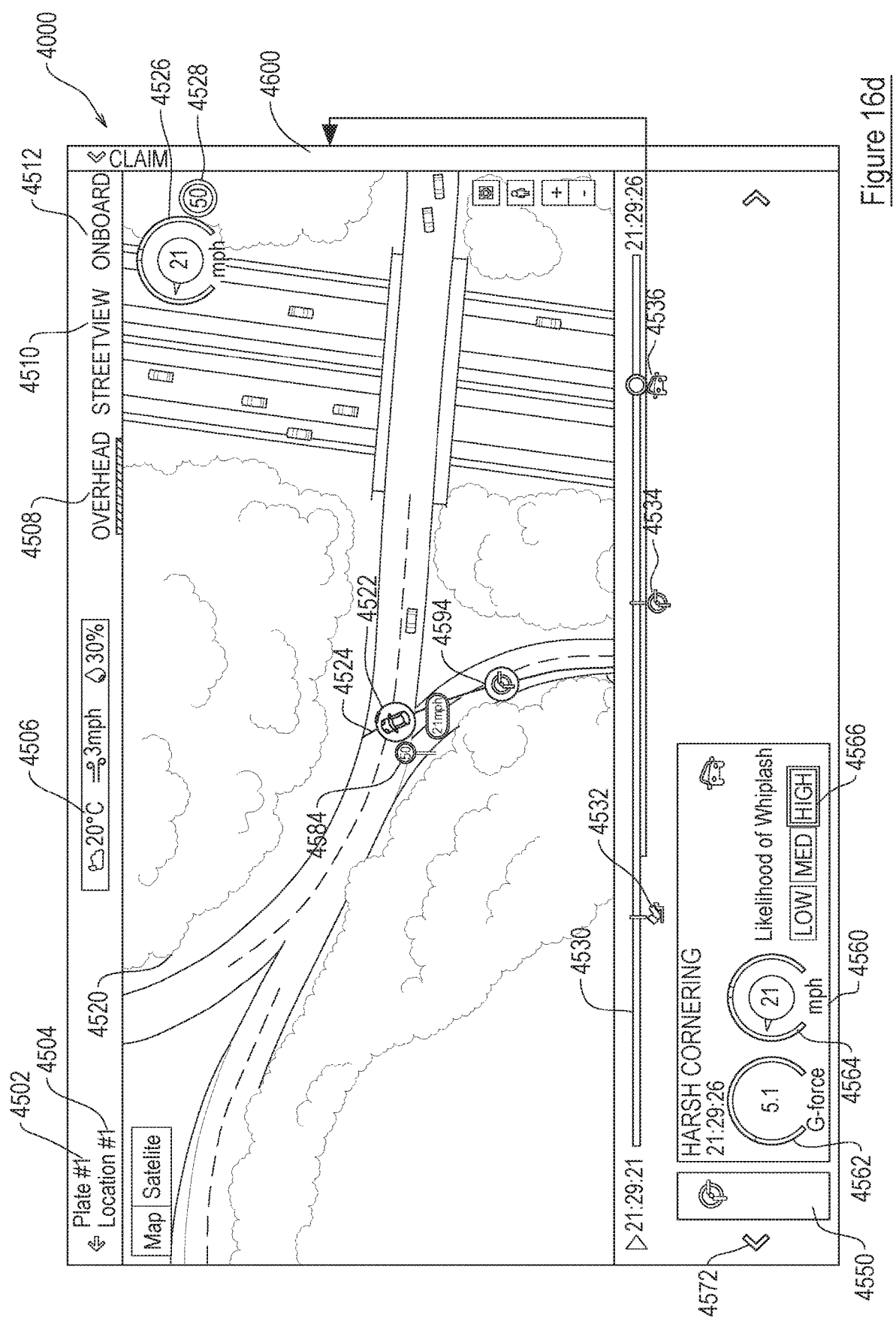

FIG. 16d shows a view of the interface 4000 when the third event (impact) is selected.

As before all aspects of the interface are updated. The speed limit indicator 4584 is no longer greyed out, indicating that this speed limit applies to the vehicle at the selected time.

The location 4594 of harsh cornering is displayed on the path 4524 of the vehicle representation 4522.

The item events are also updated, so that there is no longer an item for the first event (harsh braking) shown and the item 4550 for the previous event (harsh cornering) is minimised. The initial scrolling means 4570 (that selecting the subsequent event) is no longer shown, as there are no following events recorded. The speed of the vehicle at the point of impact is shown, as well as an indication of the impact location.

This chronological display enables an agent to view the events preceding and following a collision alongside contextual data to better understand the causes of a collision. This enables a rapid and accurate determination of liability.

In some embodiments, the agent is able to annotate the interface 4000, to display further information or an agent opinion. This is of use if the same, or another, agent reviews the collision at a later time. In particular this is used to explain/summarise any aspect of the collision for other parties, as the data may later be shared with colleagues, legal entities, or the persons involved in the collision.

In some embodiments a virtual reality model is created, where a user is able to view (and/or hear) the events preceding, and comprising, a collision.

Figure 17:
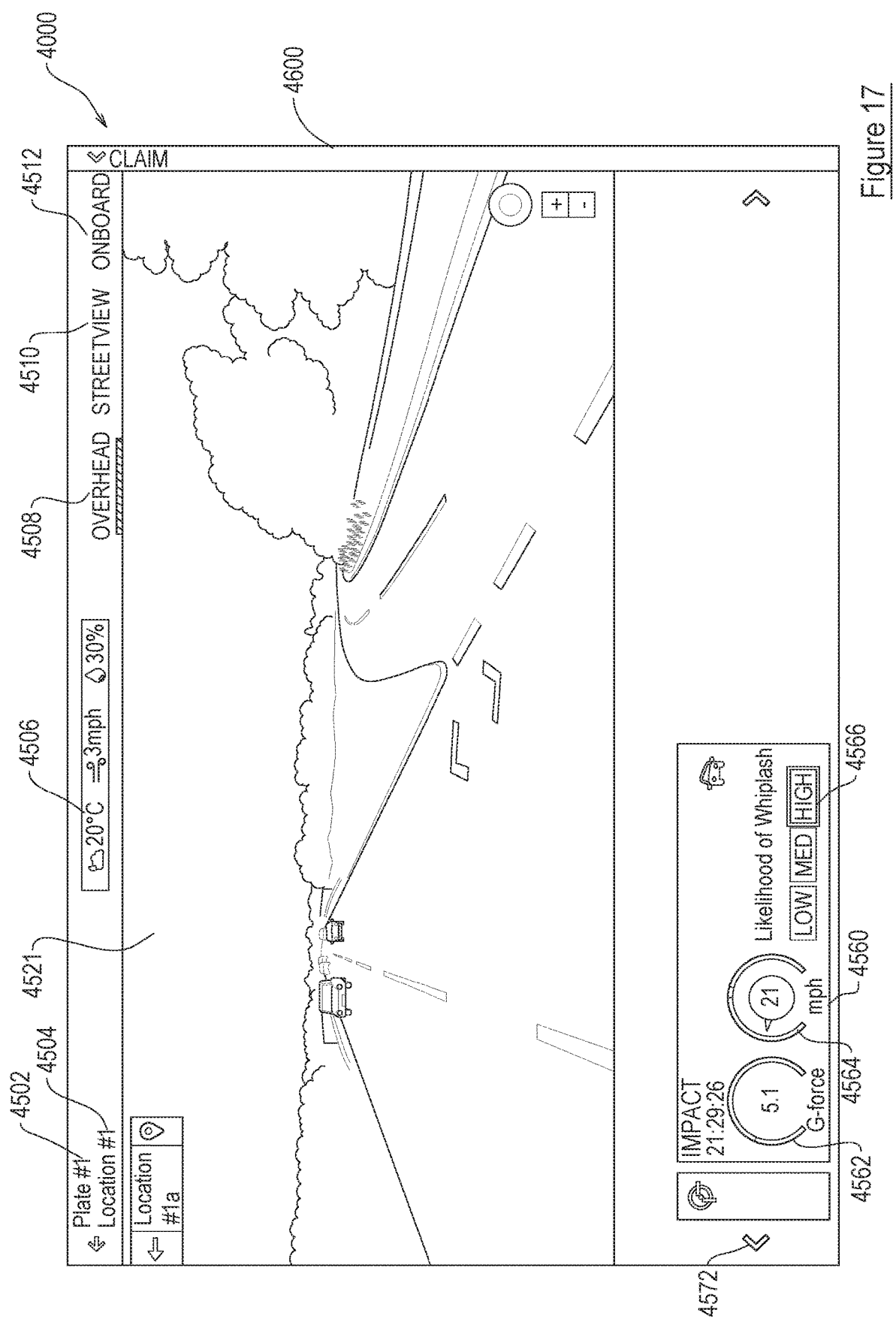
FIG. 17 shows a view of an interface for displaying a street level map view of a collision location.

FIG. 17 shows a view of an interface for displaying a street level map view of a collision location.

A 'streetview' is selected using a selection means 4510. This shows a street level image 4521 of the location, where this image may not be captured at the time of the collision: as such this view may not display prevailing weather conditions, or the vehicles present at the time of the collision.

Such a streetview is used by an agent to improve this agent's understanding of the context of a collision, for example: a streetview containing an intersection enables the agent to understand the rights of way and lines of sight at this intersection.

FIG. 18 show various views of an interface which contains a section for viewing information related to a potential claim.

Figure 18A:
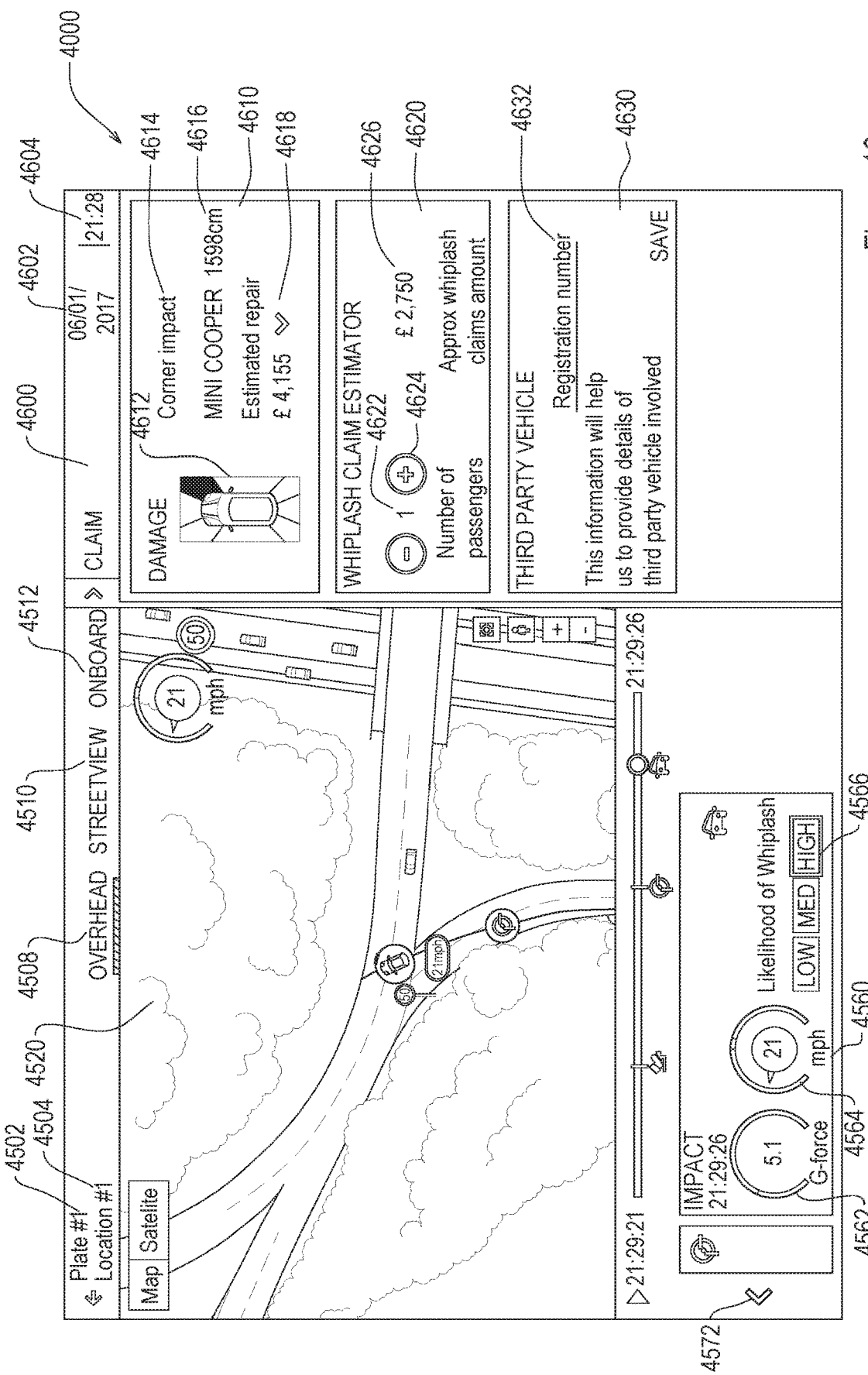

FIG. 18a shows a view of an interface 4000 where a claim section 4600 is used to display information related to a potential claim.

Within the claim window 4600:

Information related to the claim, here the date 4602 and time 4604 of the collision, is displayed.

There is a damage assessment item 4610, within which is displayed the predicted zone and severity 4612 of any vehicle damage; this may indicate severity using a binary system (here the zones impacted are shown), or measure with greater resolution, such as a colour gradient. The damage display may use a greater resolution, where a greater number of zones, is shown. The damage shown here relates to the vehicle containing the data recording means. Whilst a 2D visualisation is shown, it would be possible to render a 3D visualisation of the damage to the vehicle based on the known make, model, colour of the vehicle, and the area(s) of the impact. A 3D visualisation may make it easier for a user to virtually 'inspect' the vehicle.

In some embodiments a virtual reality model is generated, where this may be sent to a mechanic, and used to assess a collision.

A collision characterisation 4614, information 4616 about the vehicle damaged, and an estimated repair cost 4618, are presented. This repair cost is dependent upon the type of vehicle, and the location/severity of impact.

There is an injury item 4620, which displays the expected costs 4626 of an injury claim. Such a claim is dependent upon the number of passengers 4622; a means 4624 is provided to alter this number. An approximate total claim amount is determined from an expected injury claim amount per passenger, where this may be set by regulations.

There is a third party vehicle item 4630 containing an input field 4632 where information about other vehicles involved in a collision is entered.

Preferably this information is a registration number, where the make, model, dimensions, and mass of a vehicle are determined using this number (with a vehicle registration lookup service). Advantageously, a registration number is simple to obtain, either from an occupant of a vehicle involved in a collision or from an accident report.

There may be multiple items 4630, or multiple input fields 4632, into which information about multiple other vehicles can be entered.

Collision calculations use information about the other vehicles involved in order to estimate the parameters of the collision: the mass of other vehicles involved is used to obtain the speeds of the other vehicles at the time of the collision. Data related to the make and model (and any modifications) of each other vehicle is then used to estimate the repair costs for these vehicles.

Information which is needed for cost estimation or an evaluation of the collision, such as the number of passengers, and the registration number of any other vehicles involved, is obtained from:
- data recording means, such as;
  - video recordings, where there registration number recognition systems may detect a registration number without input from an agent.
  - sensors related to the car, such as pressure sensors, or seatbelt detectors may be used to select a number of passengers, or to predict injuries.
- occupants of the vehicle;
- third party reports, such as an emergency services accident report.

In some embodiments, a notification is sent to an occupant automatically upon a collision being detected, where required information is requested. There is also the opportunity for this occupant to provide further information, such as their recollection of the collision.

Figure 18B:
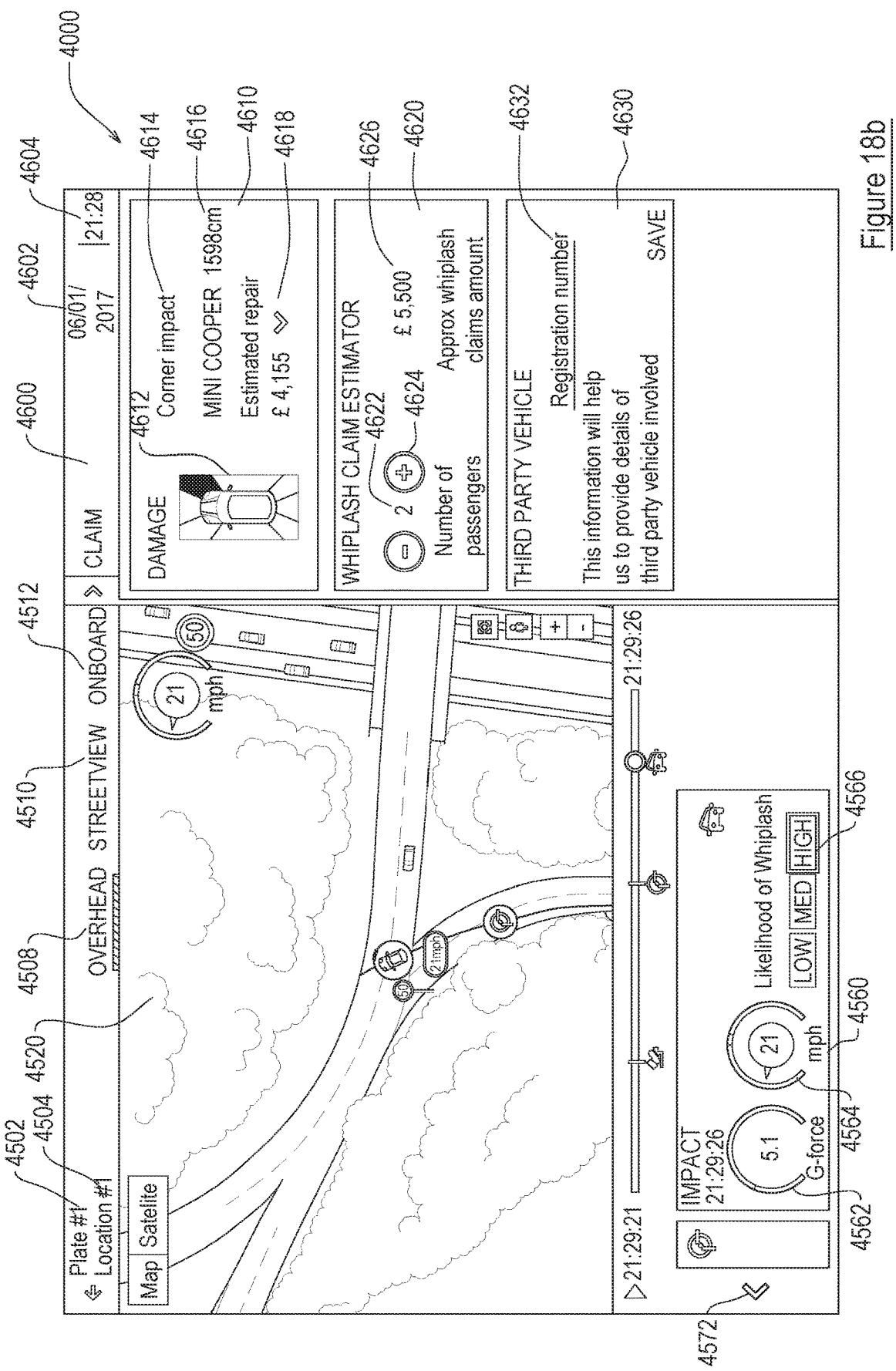

FIG. 18*b* shows a view of the interface 4000 where, within the injury item 4620, the number of passengers 4622 has been updated to obtain a different estimate 4626 of a potential injury claim.

FIG. 18*c* shows a window 4700 which is be used to view details of the calculation of estimated repair costs.

Such a window is opened by the agent by clicking upon the estimated repair cost 4618.

Parts which require repair are predicted from the evaluation of the collision, prices for replacement parts related to the vehicle are estimated, and a cost of paint and labour is included to calculate a total estimated repair cost. This depends upon the location and time of the collision, where mechanics in some locations are more expensive than those in other locations, and there may be busy periods where mechanic or part prices increase.

Figure 18D:
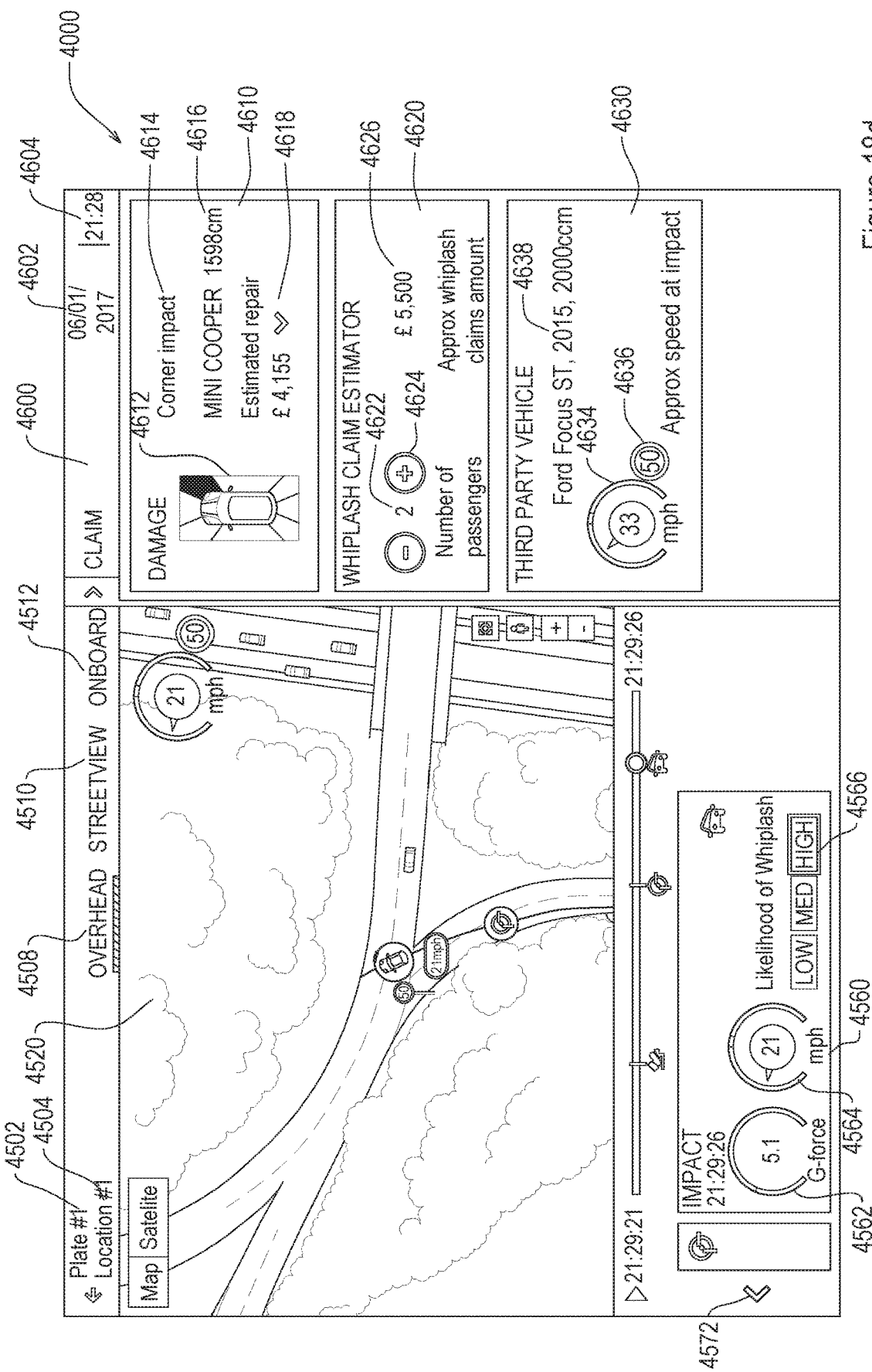

FIG. 18*d* shows a view of the interface 4000 where information related to another vehicle involved in the collision has been obtained.

The third party vehicle item 4630 now shows the make/model of the other vehicle 4638 involved in the collision as well as an indicator which is used to assess liability. Here the speed of the other vehicle 4634 at the time of impact is shown alongside the speed limit 4636 and an indicator which shows a suggested safe speed, for example colour coding.

The speed 4634 is obtained using the known properties of the vehicle containing the data recording means, and a mass and dimensional profile of the other vehicle obtained from an input registration number (as is described above).

In some embodiments, it is possible to incorporate data from any other vehicles involved, or any vehicles which were in a similar geographical location, where such vehicles may also have recorded telematics, audio, or visual data. Where available, this data is used to obtain a more accurate model of the collision.

In some embodiments, there is an option to include additional data to obtain a more accurate estimation of the speeds involved, for example there is the option to estimate the loading of another vehicle, where a fully loaded vehicle will be significantly heavier than an unloaded vehicle.

In some embodiments a range of evaluations are made, where a range of possible evaluation inputs are used to account for uncertainties, such as the uncertainty of the loading of the vehicles involved. This may be used to obtain, for example: worst case, best case, and/or most probable evaluations/costs.

In some embodiments, the third party vehicle item 4630 also displays a vehicle repair cost and/or an injury claim estimation.

In some embodiments, there are indicators included on the map for any other vehicles involved, where the third party vehicles may be displayed alongside estimated paths, or speeds, as for the vehicle containing data recording means.

ALTERNATIVES AND MODIFICATIONS

Various other modifications will be apparent to those skilled in the art, for example:

The detailed description has primarily considered the use of an interface by an (insurance) agent. Such an interface may be used by any user, for example a party involved in a collision, or a mechanic. The interface, or the data contained within the interface, may be used in collaboration, so that multiple users may input and view information. The interface shown may depend on the party viewing the interface, for example a vehicle occupant may only be able to view the items where information is required (regarding the number of passengers, or other vehicles involved), a mechanic may be able to view only the damaged parts list.

While the detailed description has primarily considered a collision wherein two vehicles are involved in a single impact, a collision may comprise any number of vehicles or impacts, so that a collision may be detected by a vehicle impacting one or more vehicles and another impact, with the same or other vehicles, may be detected as an event within the same collision, or a separate collision.

The detailed description has primarily considered the use of this method to evaluate a collision comprising an impact. The method may similarly be used to evaluate any driving event, for example a harsh braking event may trigger the storage of data—where such an event is considered a collision for the purposes of the disclosures herein. This data may be used, for example, to evaluate operator performance, where the interface provided may be used to better assess whether the operator of a vehicle has made any unsafe decisions, or whether an event is due to factors outside of this operator's control. Such an evaluation may be used in insurance decisions, where triggering numerous evaluations may result in an increase in insurance premiums.

The methods and systems provided here may be used with any method of estimating the severity of an impact: while the method here is useful for a simple estimate where only the properties of one vehicle are known, there are other methods that may be used, where if more information is available a collision may be characterised with more accuracy. Such methods may involve computer simulations, for example finite element analysis (FEA) or monte-carlo simulations. Within these methods objects may be modelled with any degree of accuracy, so that point sources may be used to model a vehicle, or a detailed dimensional and mass-distributed model may be used. The model used may depend upon the information available or a deadline by which a severity estimate is needed, where more accurate methods may require significant computing times.

In some embodiments, there may be a reduced amount of data that is being recorded during normal operation, where an increased amount of data is then recorded upon an event, for example: only the acceleration may be recorded during normal operation, where an event comprising surpassing a threshold acceleration results in other data being recorded— however this method risks missing potentially key events leading up to a collision.

The methods and systems provided here may be used with autonomous vehicles, where costs and liabilities may be determined as disclosed. These methods and systems may also be used to assess the performance of autonomous features, where it may be possible to identify errors in the control systems of autonomous vehicles. In such a use-case, any sensor/operational data from the autonomous vehicle could be used as the 'telematics data' referred to herein.

The processes disclosed herein which are related to a person may similarly be performed by a processor, so that any communications, or determinations, may occur using a processor, where these determinations may use machine learning, or artificial intelligence to improve accuracy. Any processes carried out by a processor may be transmitted to a person for approval.

While the detailed description has primarily considered the methods being used as related to a vehicle collision, these methods may be used wherever a threshold measure related to recorded data is exceeded: for example, such a method may be used in sport, where injuries and fault may be determined, or as an injury detection system where a smartphone may be able to detect an injury and notify a third party as appropriate. A particular use may, for example, be within skiing, where a collision, or a fall, may be detected, the resultant injuries predicted, and an emergency service contacted if severe injuries are considered likely.

In a similar manner as described in relation to vehicles, it would be possible to utilise telematics data from a user's mobile phone when to detect a collision and determine the likely liability of a collision. In the example of skiing, it would be possible to determine what type of 'run' the user was on (e.g. green, red, black or 'off piste'), how fast they were skiing leading up to the collision, and whether or not an object or another skier was impacted. This could affect the level of compensation offered, for example if the terms and conditions of the insurance did not cover 'off piste'.

It will be understood that the present invention has been described above purely by way of example, and modifications of detail can be made within the scope of the invention.

Reference numerals appearing in the claims are by way of illustration only and shall have no limiting effect on the scope of the claims.

What is claimed is:

1. A computer program product comprising a non-transitory medium storing thereon computer program instructions which, when executed by a hardware processor, cause the hardware processor to execute a method of simulating a vehicle collision based on computer analysis, the method comprising:

receiving telematics data of a first vehicle relating to a collision involving said first vehicle and a second vehicle; wherein said telematics data of the first vehicle includes one or more of acceleration of the first vehicle and speed data of the first vehicle;

obtaining a mass of the second vehicle involved in said collision; and creating a model of the collision from said received telematics data of the first vehicle to determine one or more features of said collision, wherein creating said model comprises:
   determining, from the telematics data of the first vehicle, at least one spring constant for modelling an elasto-plastic deformation of the first vehicle;
   determining a speed of said second vehicle based on said telematics data of the first vehicle, said mass of the second vehicle, and said at least one spring constant for modelling an elasto-plastic deformation of the first vehicle;

generating a computer simulation of said collision based on the model;

determining a collision severity based on said model of the collision; and notifying an entity of said collision based on the determined severity of the collision; and determining a cost of repair based on said model and based on a cost of one or more of:
   components in an impact area,
   a likelihood of a component being damaged based on the received telematics data, and
   historical repair data.

2. The computer program product according to claim 1, wherein the method further comprising determining an impact area based on said received telematics data, said impact area comprising one or more zones relating to a vehicle or one or more points on a vehicle, wherein determining an impact area comprises determining at least one of:
   a rotation of a vehicle,
   a partial inversion of a vehicle, and
   a full inversion of a vehicle.

3. The computer program product according to claim 1, wherein the method further comprising determining one or more events associated with the collision, wherein the associated events are one or more of: braking; cornering; acceleration; deceleration; rotation of a vehicle; partial or full inversion of a vehicle; loss of traction; and a secondary collision.

4. The computer program product according to claim 1 wherein the model models the collision at subsecond resolution.

5. The computer program product according to claim 1, wherein
   said entity is one or more of an emergency service; an occupant of a vehicle involved in said collision; and an insuring entity.

6. The computer program product according to claim 1, wherein the method further comprising determining at least one of:
   a probability of injury, and
   an injury compensation cost based on one or more of:
      a magnitude of the collision;
      a direction of the collision;
      a rotation of a vehicle;
      a partial inversion of a vehicle;
      a full inversion of a vehicle; and
      a probability of whiplash.

7. The computer program product according to claim 1, wherein the telematics data comprises data from one or more of: a gyroscope, an accelerometer; GPS data; a video recording; an audio recording; onboard diagnostics data; and data received via a satellite or other wireless link to a device which collected the data.

8. The computer program product according to claim 1, wherein the method further comprising determining a measure of liability based on one or more of: a right of way; a classification of a road or a junction; a lane a vehicle is in; a lane change manoeuvre; a measure of a manoeuvring intent; a reversing movement; a highway code; case law; mapping information; and a cognitive reasoning model.

9. The computer program product according to claim 1, wherein said telematics data is used to evaluate the operation of a further entity involved in said collision.

10. The computer program product according to claim 1, wherein the method further comprises determining a velocity of the second vehicle involved in said collision based on its momentum and mass.

11. The computer program product according to claim 1, wherein the method further comprises obtaining a mass of the second vehicle involved in said collision using a vehicle registration number of the second vehicle.

12. The computer program product according to claim 1, wherein the method further comprises determining whether the second vehicle involved in said collision was speeding preceding said collision.

\* \* \* \* \*